(12) United States Patent
Itou et al.

(10) Patent No.: US 9,437,942 B2
(45) Date of Patent: Sep. 6, 2016

(54) ASSEMBLY

(71) Applicant: Japan Aviation Electronics Industry, Ltd., Tokyo (JP)

(72) Inventors: Yasukazu Itou, Tokyo (JP); Akira Kuwahara, Tokyo (JP)

(73) Assignee: JAPAN AVIATION ELECTRONICS INDUSTRY, LTD., Tokyo (JP)

( * ) Notice: Subject to any disclaimer, the term of this patent is extended or adjusted under 35 U.S.C. 154(b) by 0 days.

(21) Appl. No.: 14/432,393

(22) PCT Filed: Jun. 20, 2013

(86) PCT No.: PCT/JP2013/003855
§ 371 (c)(1),
(2) Date: Mar. 30, 2015

(87) PCT Pub. No.: WO2014/054203
PCT Pub. Date: Apr. 10, 2014

(65) Prior Publication Data
US 2015/0280336 A1 Oct. 1, 2015

(30) Foreign Application Priority Data
Oct. 2, 2012 (JP) ................................ 2012-220109

(51) Int. Cl.
*H01R 4/30* (2006.01)
*H01M 2/30* (2006.01)
(Continued)

(52) U.S. Cl.
CPC ............ *H01R 11/287* (2013.01); *H01M 2/202* (2013.01); *H01M 2/204* (2013.01); *H01M 2/206* (2013.01); *H01M 2/30* (2013.01); *H01M 2/34* (2013.01); *H01R 4/34* (2013.01)

(58) Field of Classification Search
CPC .... H01R 4/30; H01R 11/281; H01R 11/283; Y02E 60/12; H01M 2/30; H01M 2/305
See application file for complete search history.

(56) References Cited

U.S. PATENT DOCUMENTS

| 5,645,448 | A | | 7/1997 | Hill |
| 5,796,588 | A | * | 8/1998 | Machida ................. H01M 2/20 361/773 |

(Continued)

FOREIGN PATENT DOCUMENTS

| CN | 101855783 A | 10/2010 |
| JP | 2000331721 A | 11/2000 |

(Continued)

OTHER PUBLICATIONS

International Search Report dated Sep. 3, 2013 from corresponding Int'l Application No. PCT/EP2013/003855; 1 pg.

(Continued)

*Primary Examiner* — Gary Paumen
(74) *Attorney, Agent, or Firm* — Maier & Maier, PLLC

(57) ABSTRACT

A battery assembly includes: a receptacle connector including a receptacle contact with a bolt hole for bolting formed therein, a receptacle housing attached to the receptacle contact; a battery having an upper surface on which the receptacle contact of the receptacle connector is attached by the bolting, and a right side surface roughly perpendicular to the upper surface. The receptacle housing of the receptacle connector is formed so as to extend in an elongated shape along the tangent direction of an imaginary circle C centered on the central axis of the bolt hole of the receptacle contact of the receptacle connector as viewed in the central axis direction of the bolt hole, and is capable of coming into contact with the right side surface of the battery at the time of the bolting.

10 Claims, 28 Drawing Sheets

(51) Int. Cl.
*H01R 11/28* (2006.01)
*H01M 2/20* (2006.01)
*H01M 2/34* (2006.01)
*H01R 4/34* (2006.01)

(56) References Cited

U.S. PATENT DOCUMENTS

| | | | | |
|---|---|---|---|---|
| 5,897,392 | A * | 4/1999 | Takahashi | B60R 16/0215 429/121 |
| 6,001,506 | A * | 12/1999 | Timmons | H01M 2/307 429/121 |
| 6,695,628 | B2 * | 2/2004 | Yeh | H01R 13/2442 439/500 |
| 7,794,263 | B1 * | 9/2010 | Kim | H01R 13/6271 439/357 |
| 8,999,552 | B2 * | 4/2015 | Ogasawara | H01R 9/226 429/121 |
| 2002/0022399 | A1 * | 2/2002 | Ninomiya | H01M 2/1044 439/500 |
| 2003/0039882 | A1 * | 2/2003 | Wruck | H01M 2/30 429/121 |
| 2004/0191616 | A1 * | 9/2004 | Hirota | H01M 2/30 429/121 |
| 2005/0008929 | A1 | 1/2005 | Brede et al. | |
| 2005/0176289 | A1 * | 8/2005 | Chang | H01R 13/629 439/500 |
| 2006/0003627 | A1 * | 1/2006 | Freitag | H01R 13/68 439/504 |
| 2006/0234558 | A1 * | 10/2006 | Li | H01M 2/204 439/627 |
| 2011/0076888 | A1 | 3/2011 | Fernandez et al. | |
| 2011/0293987 | A1 * | 12/2011 | Tartaglia | H01M 2/305 429/121 |
| 2011/0305936 | A1 * | 12/2011 | Kwag | H01M 2/206 429/121 |
| 2015/0072207 | A1 * | 3/2015 | Soleski | B60R 16/03 429/121 |

FOREIGN PATENT DOCUMENTS

| | | |
|---|---|---|
| JP | 2001256956 A | 9/2001 |
| JP | 2004319515 A | 11/2004 |
| WO | 2008/151181 A1 | 12/2008 |

OTHER PUBLICATIONS

Japanese Office Action dated Aug. 20, 2014; 4 pgs.

Extended European Search Report dated Mar. 2, 2016, in connection with corresponding EP Application No. 13843879.1 (8 pgs.).

Chinese Office Action issued May 3, 2016, in connection with corresponding CN Patent Application No. 201380049431.0 (17 pgs., including English translation).

* cited by examiner

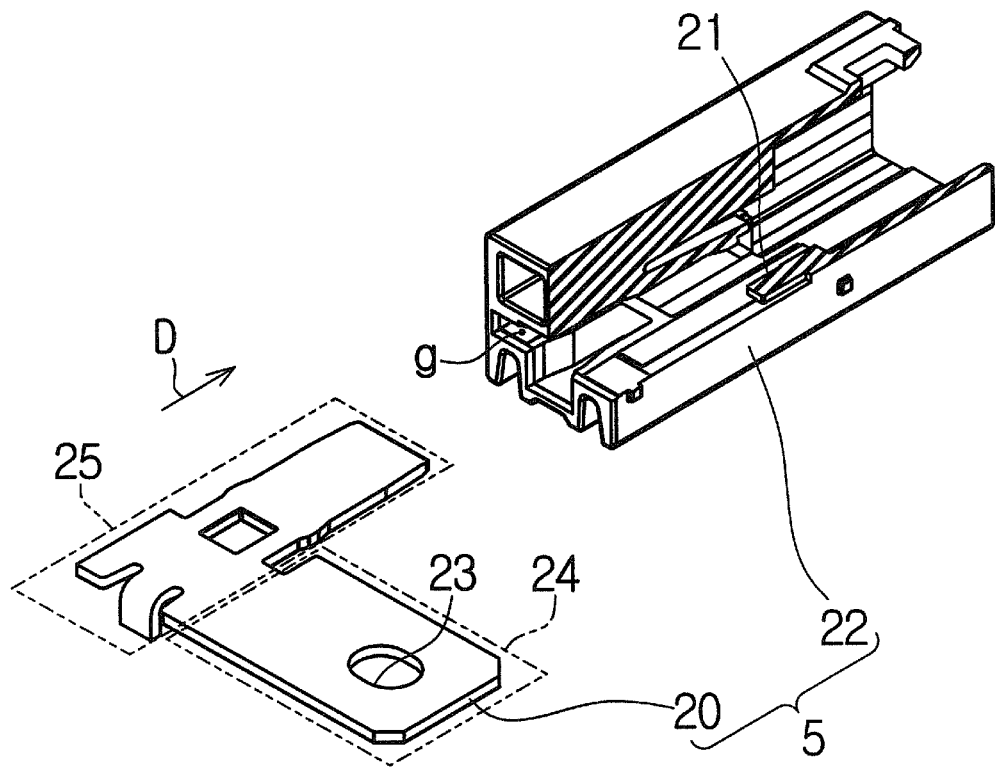
Fig. 12
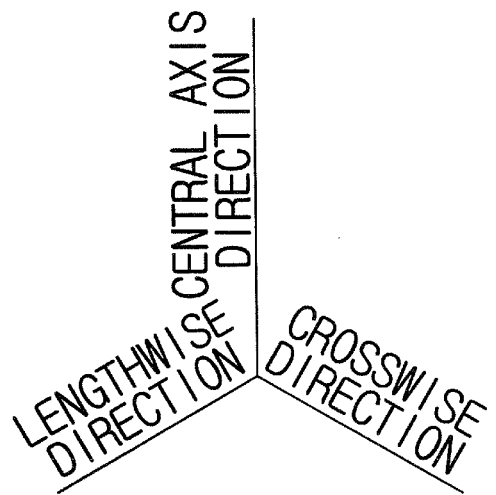

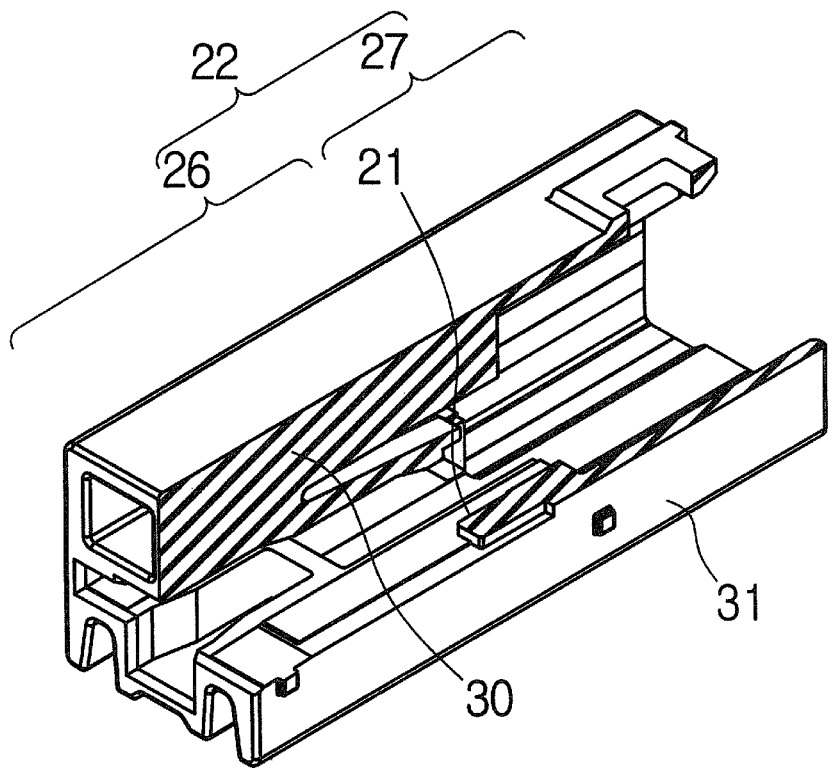
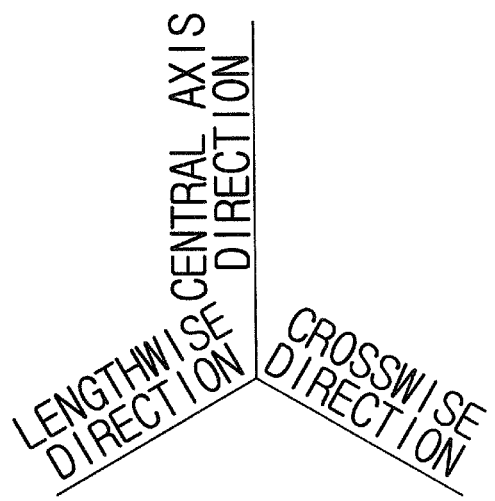
Fig. 13

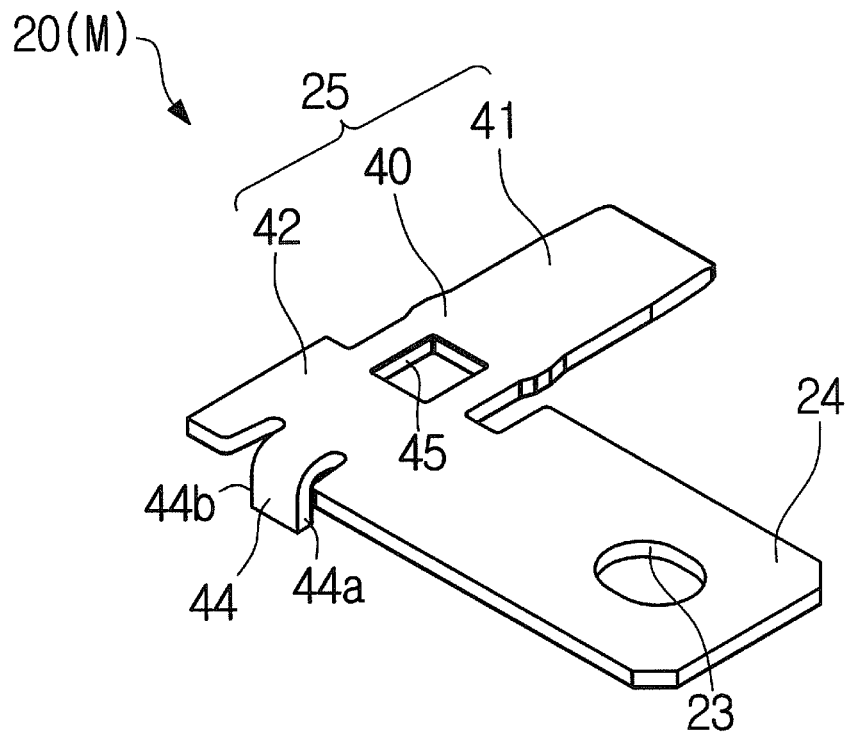
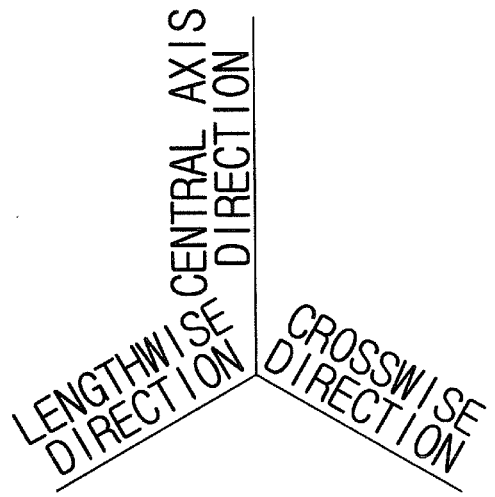
Fig. 18

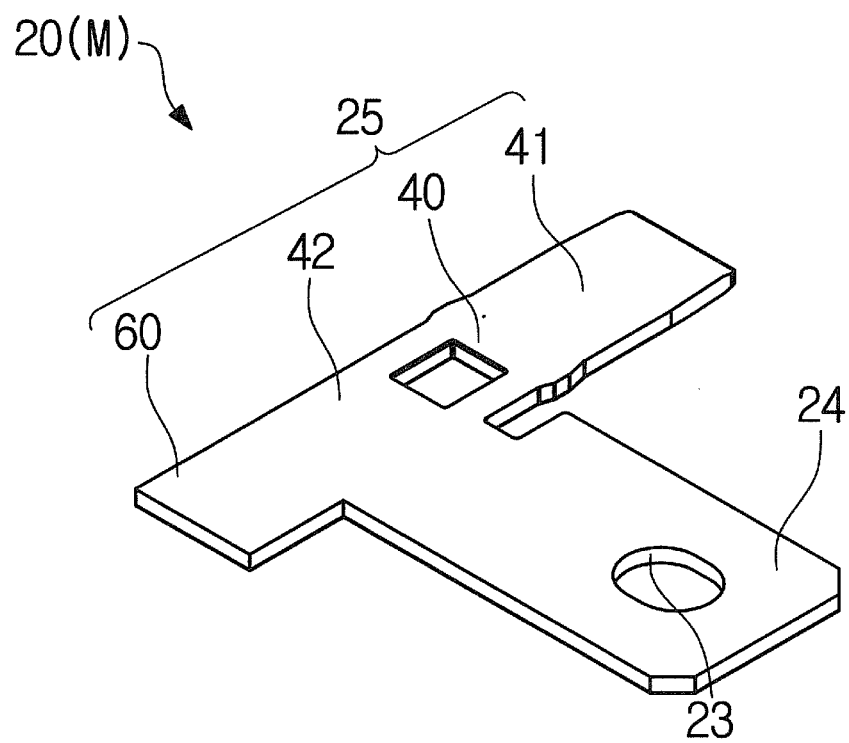
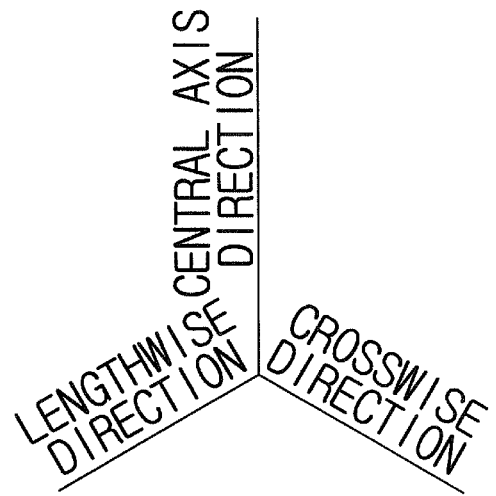
Fig. 26

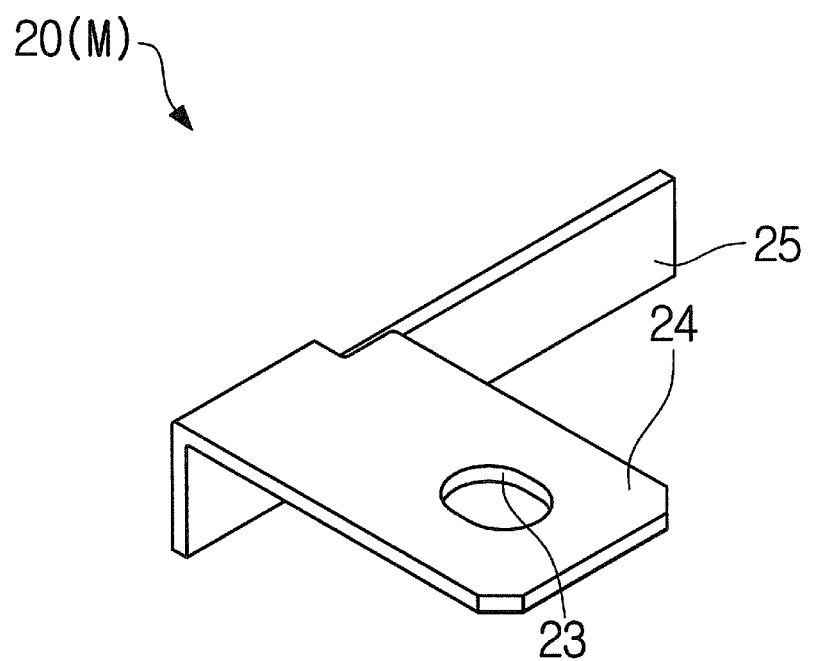
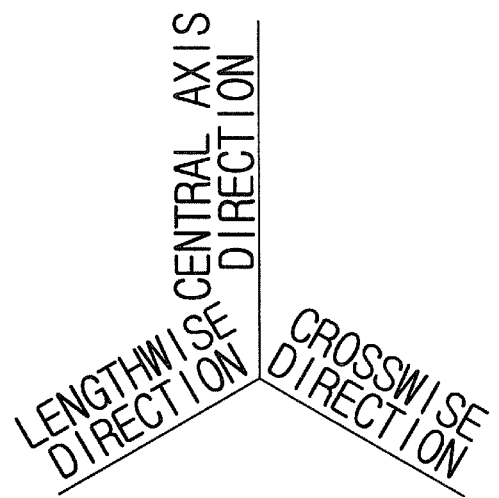
Fig. 27

ASSEMBLY

CROSS REFERENCE TO RELATED APPLICATION

This application is based upon and claims the benefit of priority from the prior Japanese Patent Application No. 2012-220109, filed on Oct. 2, 2012, and PCT Application No. PCT/JP2013/003855, filed on Jun. 20, 2013, the entire contents of which are incorporated herein by reference.

TECHNICAL FIELD

The present invention relates to an assembly.

BACKGROUND ART

As this type of technique, as shown in FIG. 28 of this application, Patent Literature 1 discloses a battery terminal connection connector 104 for connecting electric wires 100 to a battery post 103 of a battery terminal 102 of a battery 101. The battery terminal connection connector 104 includes a female connector housing 106 with a branch terminal 105 accommodated therein, and a male connector housing 108 for accommodating a connection terminal 107 connected to an end of the electric wires 100. In the branch terminal 105, an attachment hole 109 through which the battery post 103 can be inserted is formed. With this configuration, in order to attach the female connector housing 106 to the battery terminal 102 of the battery 101, the battery post 103 is inserted through the attachment hole 109 of the branch terminal 105 of the female connector housing 106 and then a nut 110 is screwed on the battery post 103.

CITATION LIST

Patent Literature

Patent Literature 1: Japanese Unexamined Patent Application Publication No. 2001-256956

SUMMARY OF INVENTION

Technical Problem

However, in the above-described configuration of Patent Literature 1, there is a risk that when the nut 110 is screwed on the battery post 103, the female connector housing 106 could rotate with respect to the battery 101.

An object of the invention of the present application is to provide a technique for preventing an electric connector from rotating relative to an object to be connected when the electric connector is screwed on the object to be connected.

Solution to Problem

According to an aspect, the present invention provides an assembly including: an electric connector including a contact with a bolt hole for bolting formed therein, and a housing attached to the contact; and an object to be connected having a first surface on which the contact of the electric connector is attached by the bolting, and a second surface roughly perpendicular to the first surface, in which the housing of the electric connector is formed so as to extend in an elongated shape along a tangent direction of an imaginary circle centered on a central axis of the bolt hole of the contact of the electric connector as viewed in a central axis direction of the bolt hole, and is capable of coming into contact with the second surface of the object to be connected at the time of the bolting.

The housing of the electric connector is capable of being disposed relative to the object to be connected so that a lengthwise direction of the housing of the electric connector is roughly in parallel with the second surface of the object to be connected at the time of the bolting as viewed in the central axis direction.

The housing of the electric connector is capable of being disposed relative to the object to be connected so that a lengthwise direction of the housing of the electric connector is roughly in parallel with the first surface of the object to be connected at the time of the bolting as viewed in a direction perpendicular to the second surface of the object to be connected.

The contact of the electric connector includes a first contact section in which the bolt hole is formed, and a second contact section connected to the first contact section, the second contact section extending along the lengthwise direction of the housing of the electric connector.

A lengthwise direction of the first contact section is roughly perpendicular to that of the second contact section.

The contact of the electric connector is formed in a roughly L-shape.

The housing of the electric connector accommodates the second contact section.

The first and second contact sections connect to each other in a halfway part in the lengthwise direction of the housing of the electric connector.

A thickness direction of the first contact section is roughly in parallel with that of the second contact section.

In the housing of the electric connector, a locking part for maintaining a connected state with a counterpart housing of a counterpart connector is formed.

The object to be connected is a battery.

Advantageous Effects of Invention

The invention of the present application provides an advantageous effect that since the housing of the electric connector is effectively caught on the second surface of the object to be connected at the time of the bolting, rotation of the electric connector with respect to the object to be connected is prevented.

BRIEF DESCRIPTION OF DRAWINGS

FIG. 12 is an exploded perspective view of the receptacle connector (first exemplary embodiment);

FIG. 13 is a partly-cut-out perspective view of a receptacle housing (first exemplary embodiment);

FIG. 18 is a perspective view of a receptacle contact (first exemplary embodiment);

FIG. 26 is a perspective view of a receptacle contact (second exemplary embodiment);

FIG. 27 is a perspective view of a receptacle contact (third exemplary embodiment)

DESCRIPTION OF EMBODIMENTS

First Exemplary Embodiment

A first exemplary embodiment according to the present invention is explained hereinafter with reference to FIGS. 1 to 24.

(Battery Unit 1)

Figure 1:
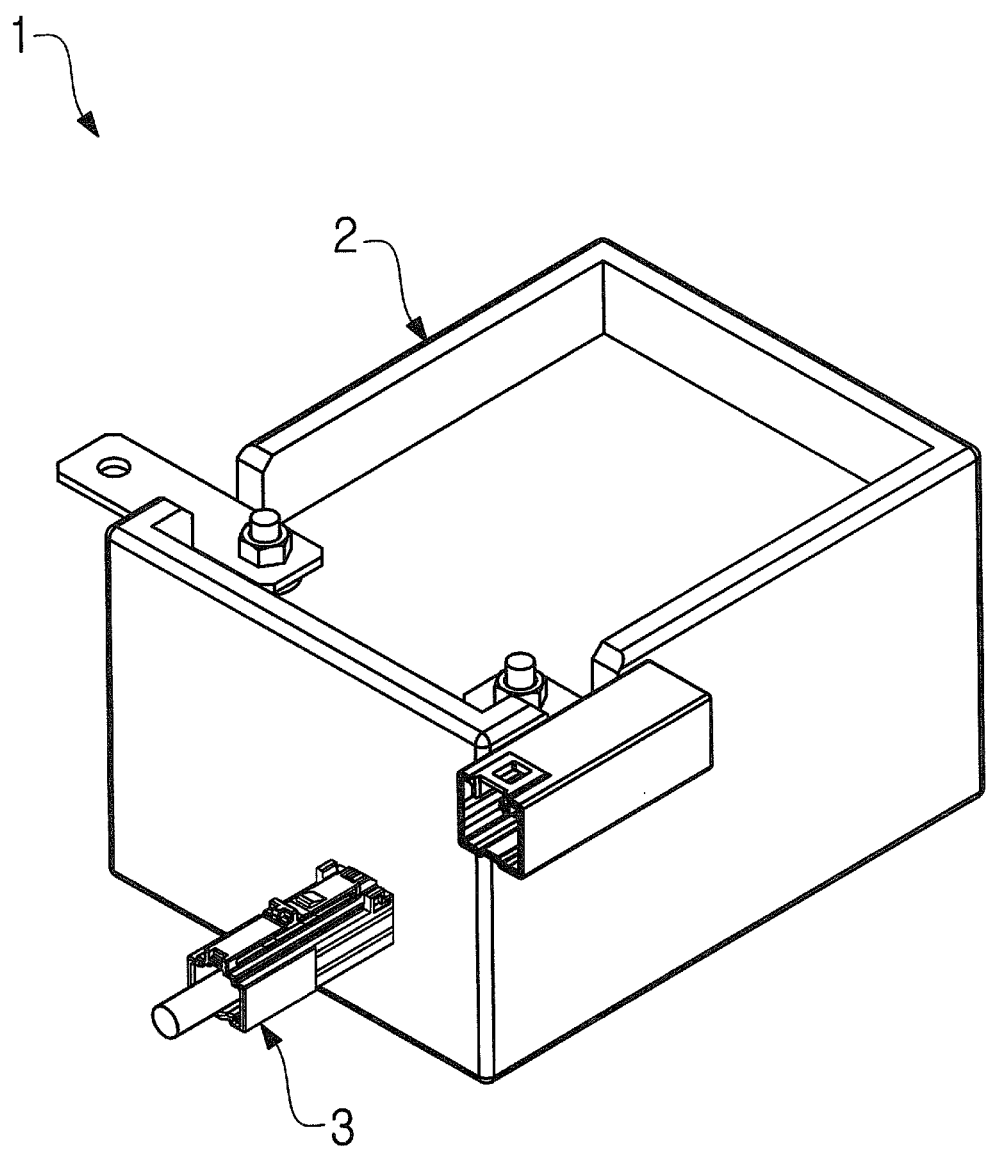
FIG. 1 is a perspective view of a battery unit (first exemplary embodiment)
Figure 2:
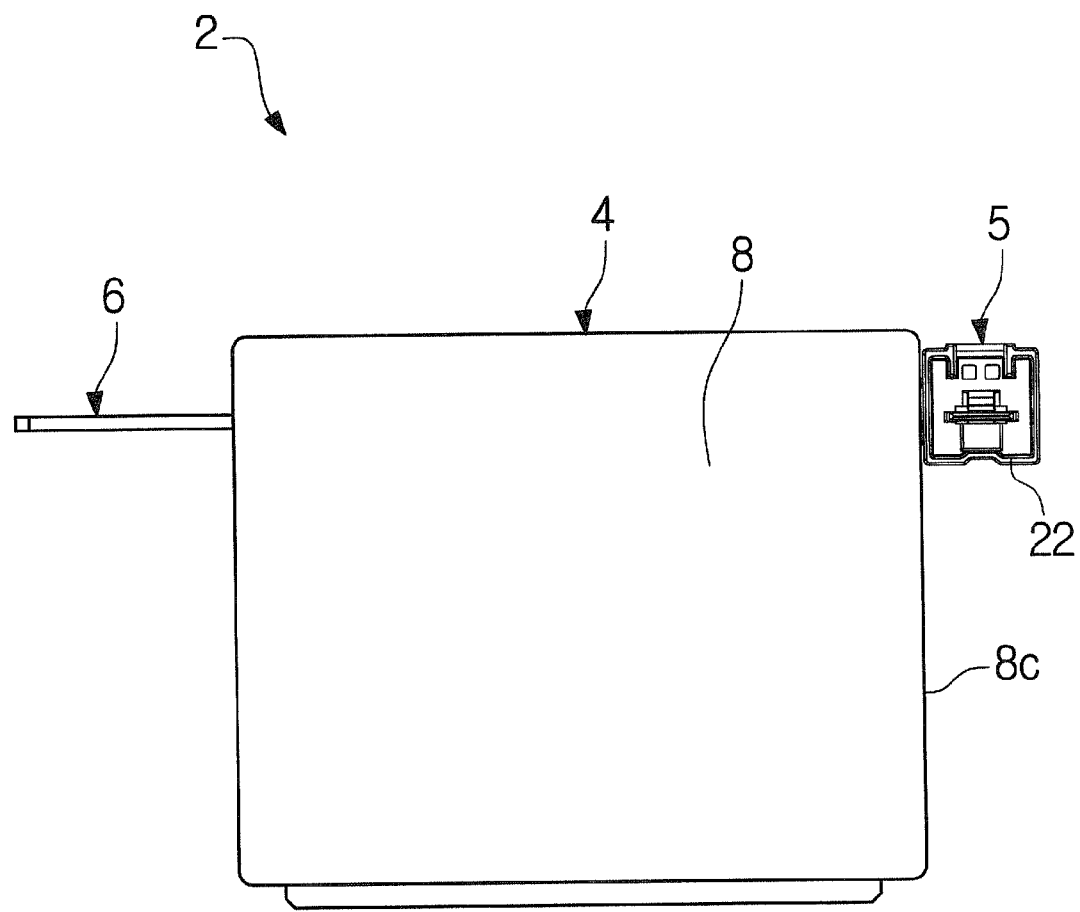
FIG. 2 is a front view of a battery assembly (first exemplary embodiment)
Figure 3:
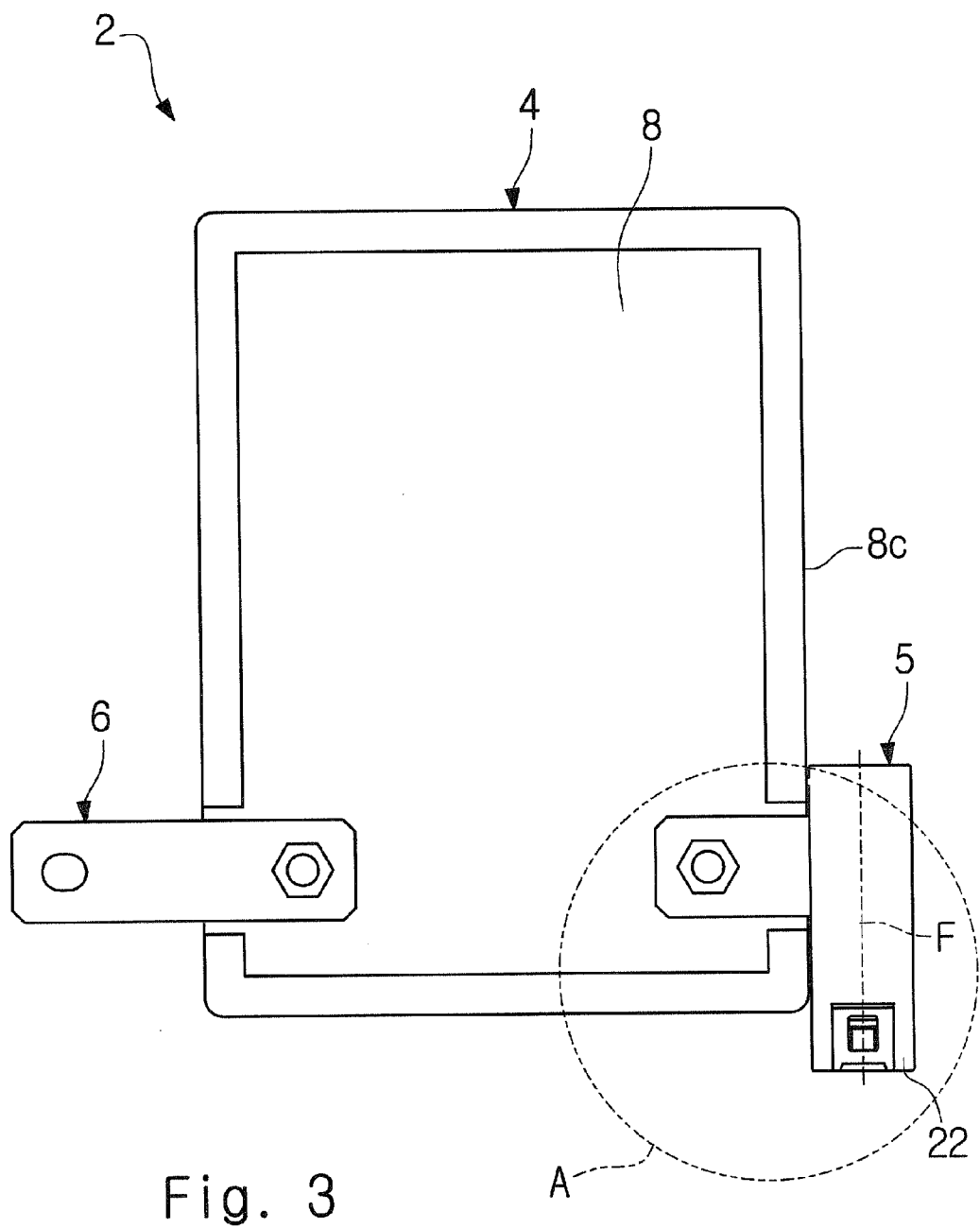
FIG. 3 is a plan view of the battery assembly (first exemplary embodiment)
Figure 4:
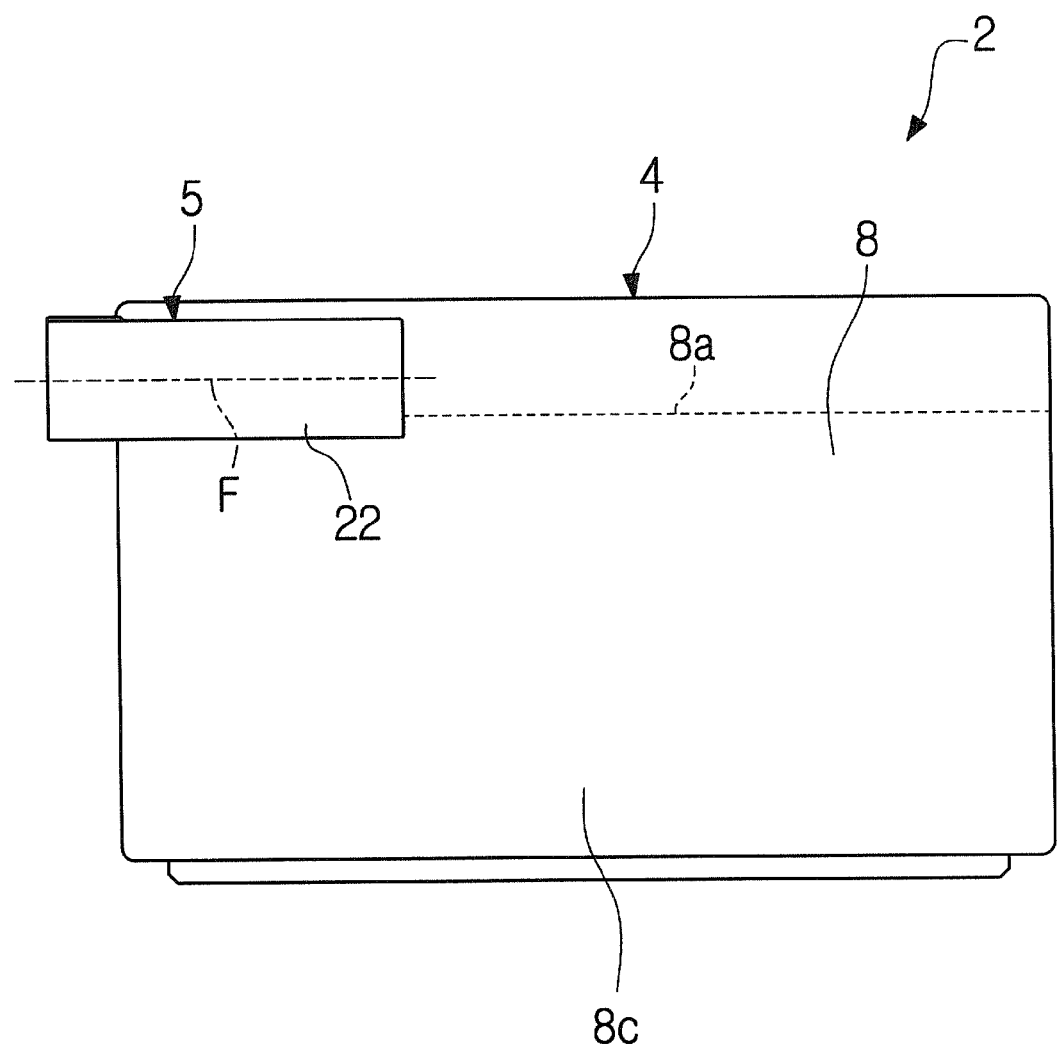
FIG. 4 is a side view of the battery assembly (first exemplary embodiment)

As shown in FIG. 1, a battery unit 1 (assembled unit) includes a battery assembly 2 (assembly) and a connecting cable 3. FIG. 2 is a front view of the battery assembly 2, FIG. 3 is a plan view of the battery assembly 2, and FIG. 4 is a side view of the battery assembly 2.

(Battery Assembly 2)

Figure 5:
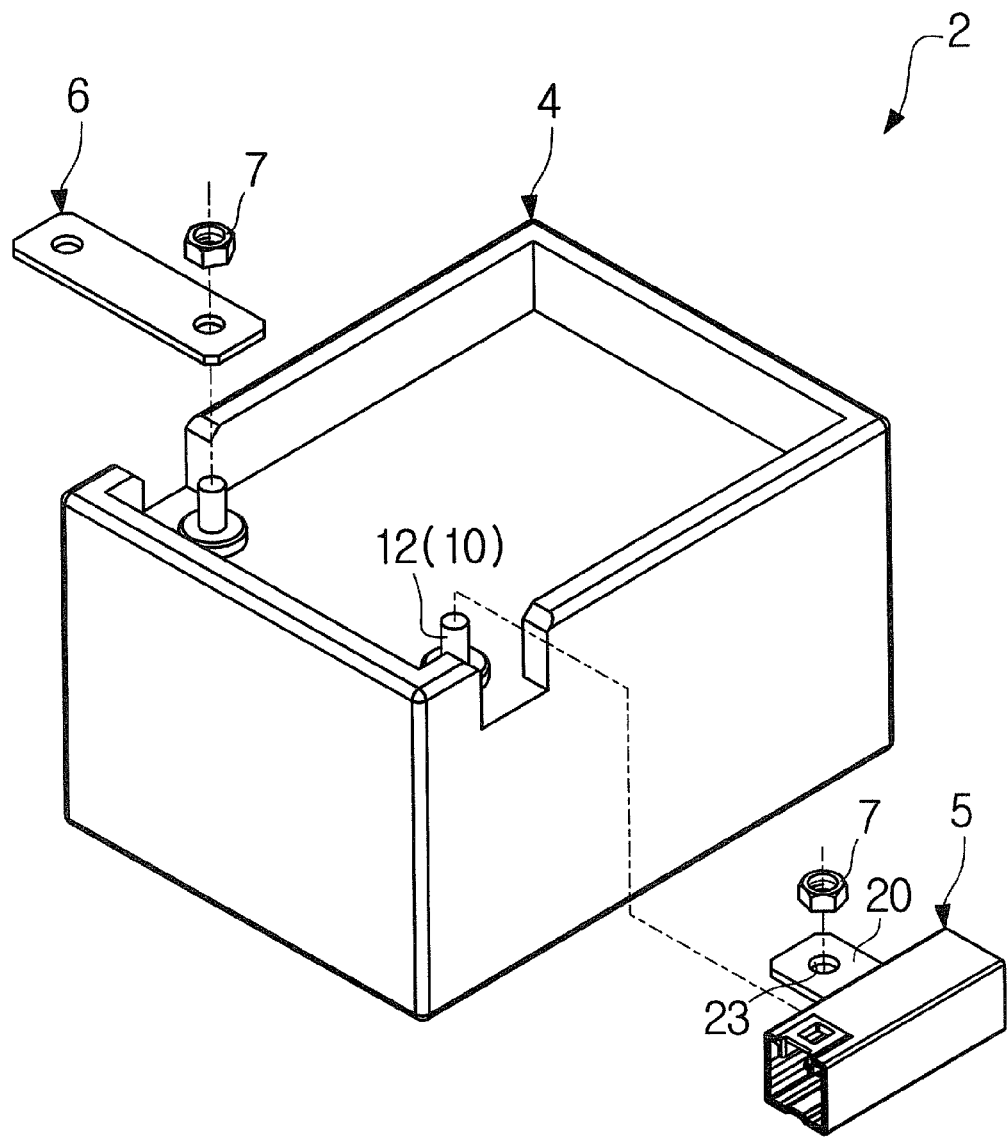
FIG. 5 is an exploded perspective view of the battery assembly (first exemplary embodiment)

As shown in FIG. 5, the battery assembly 2 includes a battery 4 (object to be connected), a receptacle connector 5 (electric connector), a bus bar 6, and a plurality of nuts 7.

(Battery 4)

Figure 6:
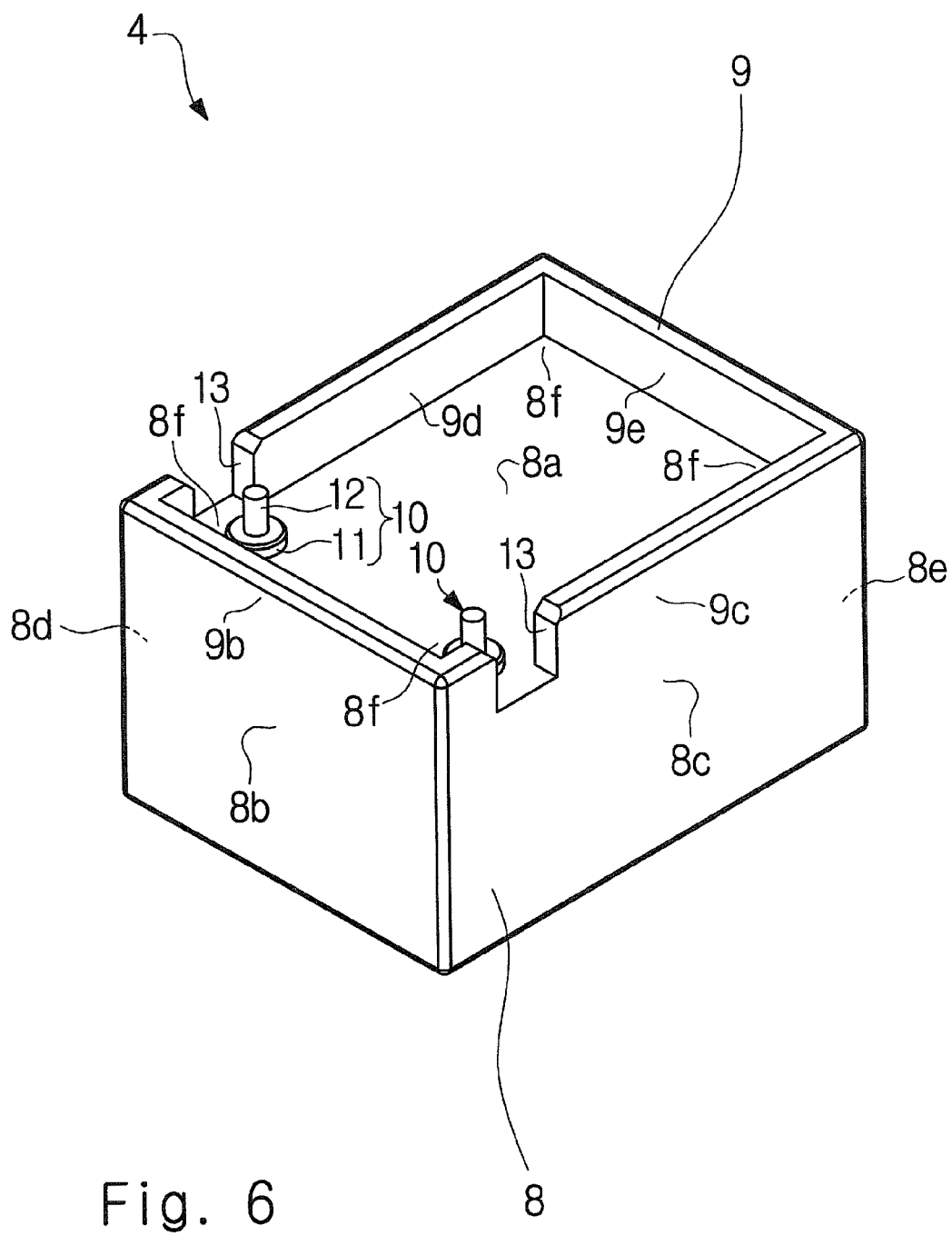
FIG. 6 is a perspective view of a battery (first exemplary embodiment)

As shown in FIG. 6, the battery 4 includes a battery main body 8, a stacking rib 9, and a pair of battery terminal units 10. The battery main body 8 is formed in a roughly rectangular parallelepiped shape having an upper surface 8a (first surface), a front surface 8b, a right side surface 8c (second surface), a left side surface 8d, and a rear surface 8e.

Therefore, the upper surface 8a is roughly perpendicular to the right side surface 8c. The stacking rib 9 is formed so as to protrude upward from the peripheral edge of the upper surface 8a and surround the upper surface 8a. The stacking rib 9 includes a front rib 9b corresponding to the front surface 8b, a right side rib 9c corresponding to the right side surface 8c, a left side rib 9d corresponding to the left side surface 8d, and a rear rib 9e corresponding to the rear surface 8e. The pair of battery terminal units 10 are formed on the upper surface 8a. Each battery terminal unit 10 is disposed in one of two corner parts 8f, which are two of four corner parts 8f of the upper surface 8a located near the front surface 8b. Each battery terminal unit 10 includes a battery terminal 11 and a battery post 12. In this exemplary embodiment, each battery post 12 is formed in a male screw shape and disposed so as to protrude upward from the respective battery terminal 11. In the right side rib 9c of the stacking rib 9, a battery terminal unit access slit 13 is formed so that a user can look in at the battery terminal unit 10 as he/she looks at the battery 4 in a direction perpendicular to the right side surface 8c. Similarly, another battery terminal unit access slit 13 is formed in the left side rib 9d of the stacking rib 9. Further, owing to the presence of the right side rib 9c, the right side surface 8c of the battery main body 8 extends upward beyond the upper surface 8a. Similarly, owing to the presence of the left side rib 9d, the left side surface 8d of the battery main body 8 extends upward beyond the upper surface 8a.

(Connecting Cable 3)

Figure 7:
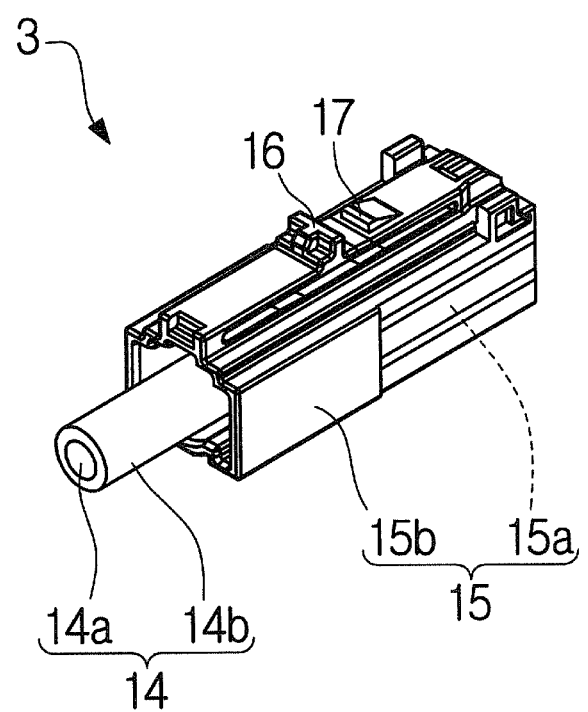
FIG. 7 is a perspective view of a part of a connecting cable (first exemplary embodiment)

As shown in FIG. 7, the connecting cable 3 includes a connecting cable main body 14 and a plug connector 15 (counterpart connector) attached to an end of the connecting cable main body 14. The connecting cable main body 14 includes a center conductor 14a and a cover material 14b covering the center conductor 14a. The plug connector 15 includes a plug contact 15a (counterpart contact) attached to the center conductor 14a, and a plug housing 15b that accommodates and holds the plug contact 15a. A lance 16 that is supported at both ends thereof is formed in the plug housing 15b. The lance 16 includes a locking claw 17.

(Receptacle Connector 5)

Next, the receptacle connector 5 is explained with reference to FIGS. 8 to 21.

As shown in FIGS. 8 to 21, the receptacle connector 5 includes a receptacle contact 20 (contact) that is capable of coming into contact with the plug contact 15a of the plug connector 15 (see FIG. 7), and a receptacle housing 22 (housing) with a contact insertion hole 21 formed therein into which the receptacle contact 20 is inserted. By inserting the receptacle contact 20 into the contact insertion hole 21, the receptacle contact 20 is held by the receptacle housing 22.

As shown in FIGS. 8 to 12, the receptacle housing 22 is formed in an elongated shape in this exemplary embodiment. Further, as shown in FIG. 12, the receptacle contact 20 is formed in a roughly L-shape. That is, the receptacle contact 20 includes a bolting section 24 (first contact section) with a bolt hole 23 for bolting formed therein, and an accommodated section 25 (second contact section) that connects with the bolting section 24 and extends along a lengthwise direction of the receptacle housing 22. A lengthwise direction of the bolting section 24 is roughly perpendicular to that of the accommodated section 25. As shown in FIG. 12, a direction in which the receptacle contact 20 is inserted into the contact insertion hole 21 of the receptacle housing 22 is indicated by an inserting direction D in this exemplary embodiment.

A "lengthwise direction", a "central axis direction" and a "crosswise direction" are defined here. In principle, the lengthwise direction means the lengthwise direction of the receptacle housing 22. The lengthwise direction includes the inserting direction D shown in FIG. 12 and a counter-inserting direction that is a direction opposite to the inserting direction D. The central axis direction means a central axis direction of the bolt hole 23. The central axis direction includes an upward direction and a downward direction. The crosswise direction is perpendicular to both the lengthwise direction and the central axis direction. The crosswise direction includes a bolting section protruding direction, which is a direction from the accommodated section 25 toward the bolting section 24, and a bolting section counter-protruding direction, which is a direction from the bolting section 24 toward the accommodated section 25.

(Receptacle Connector 5: Receptacle Housing 22)

The receptacle housing 22 of the receptacle connector 5 is explained hereinafter with reference to FIGS. 13 to 17. Further, for the sake of convenience, FIGS. 16 and 17 show cross sections of the receptacle housing 22 in a simplified manner.

Figure 14:
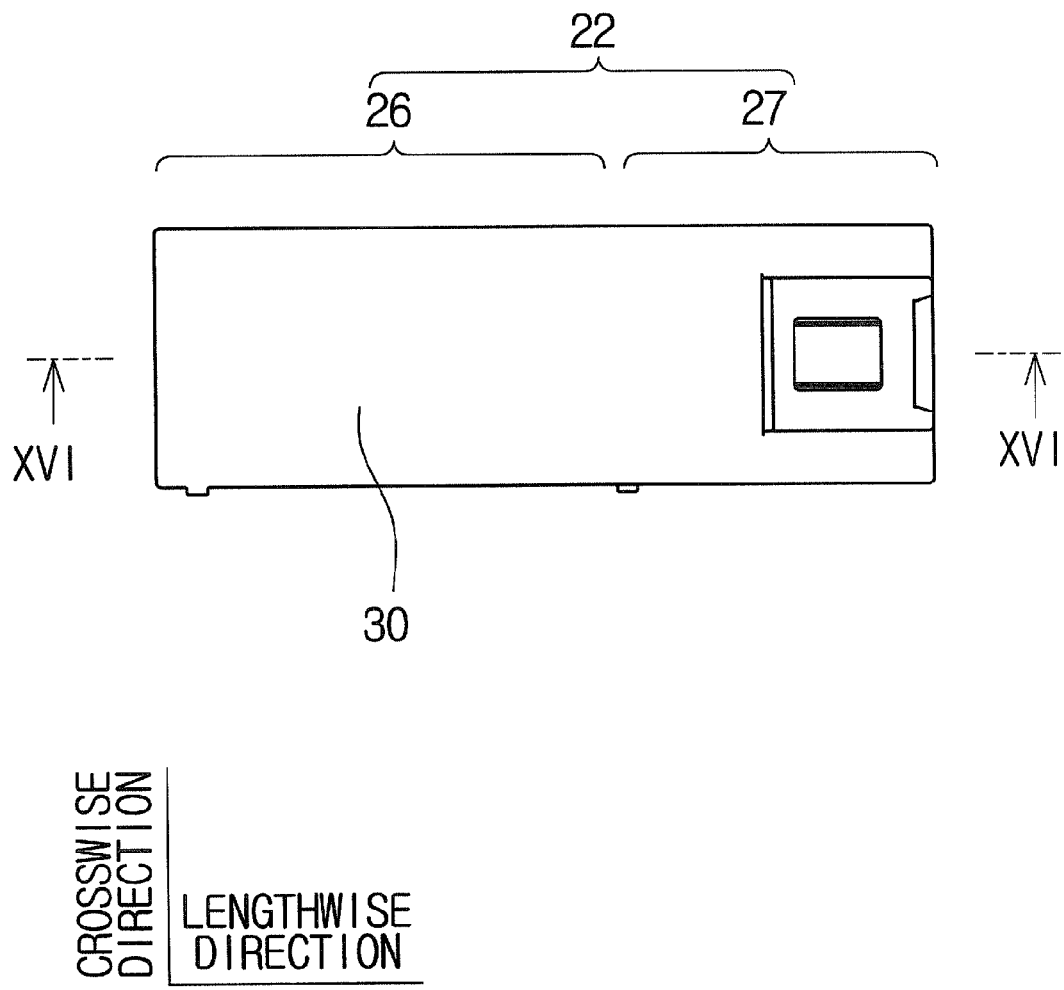
FIG. 14 is a plan view of the receptacle housing (first exemplary embodiment)
Figure 15:
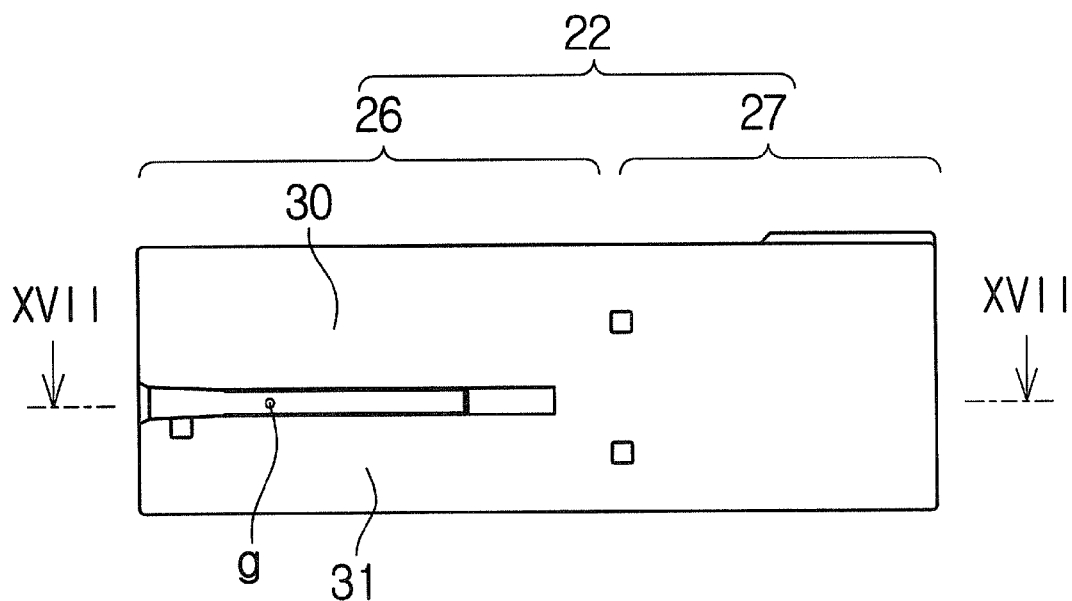
FIG. 15 is a side view of the receptacle housing (first exemplary embodiment)

As shown in FIGS. 13 to 15, the receptacle housing 22 has a roughly elongated rectangular parallelepiped external appearance. The receptacle housing 22 includes a housing main body 26 and a mating section 27. The housing main body 26 adjoins the counter-inserting direction side of the mating section 27. The mating section 27 adjoins the inserting direction side of the housing main body 26. The receptacle housing 22 is formed in a roughly tubular shape.

Figure 16:
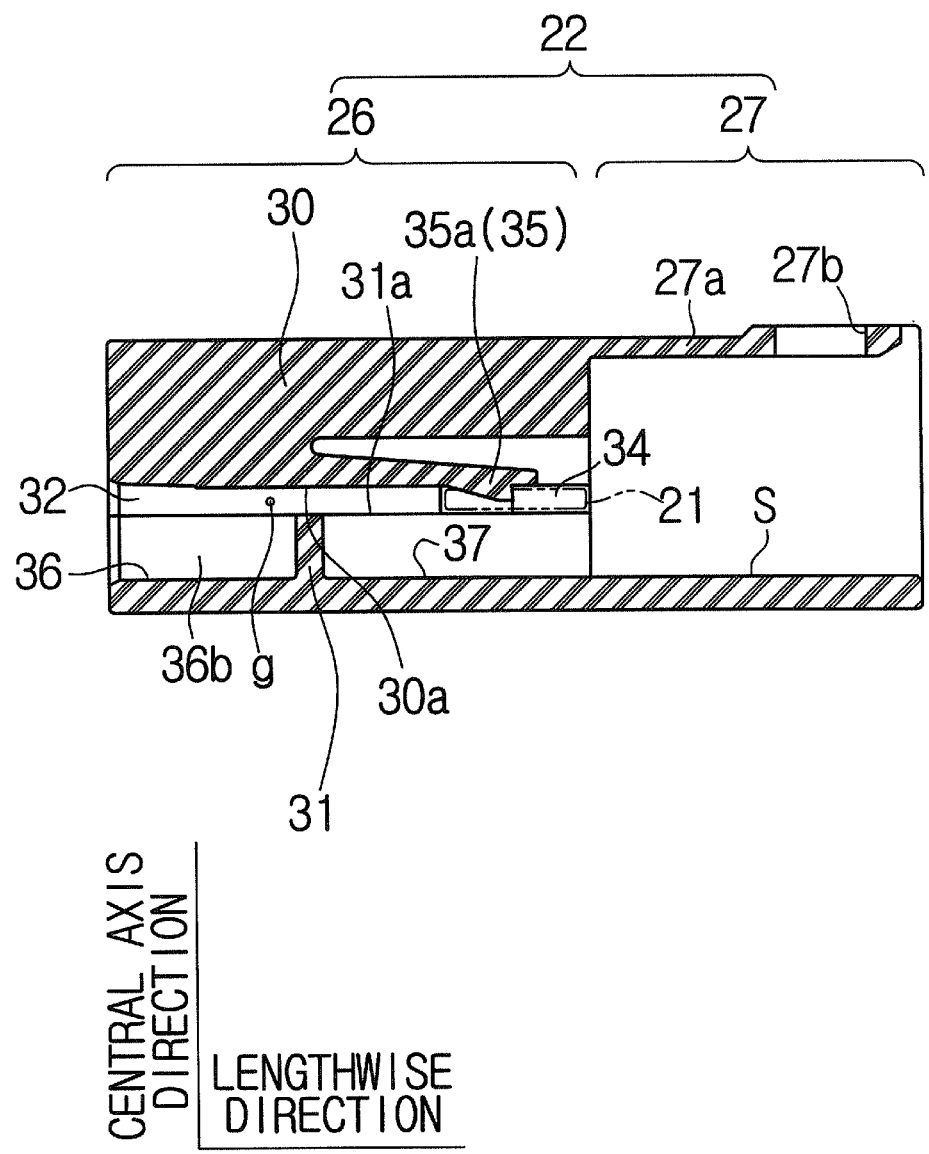
FIG. 16 is a cross section taken along a line XVI-XVI of FIG. 14 (first exemplary embodiment)
Figure 17:
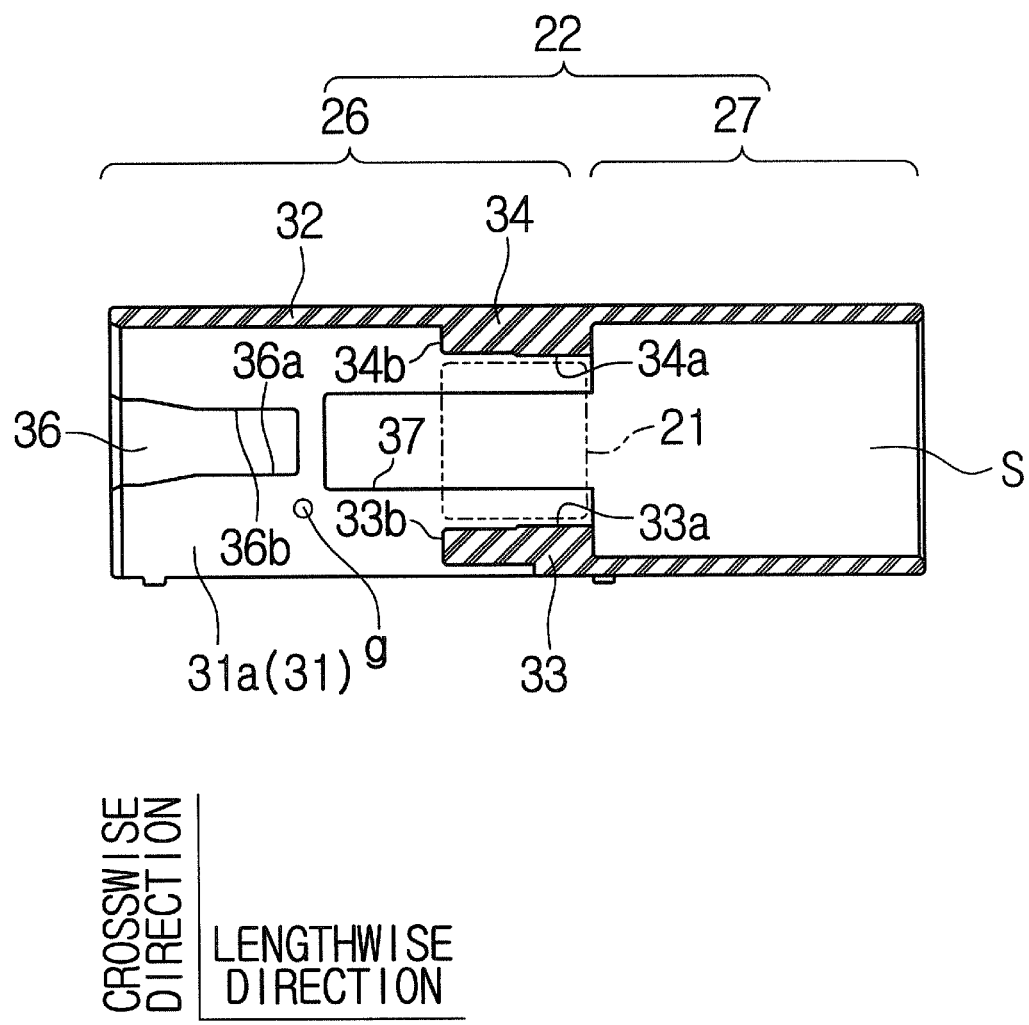
FIG. 17 is a cross section taken along a line XVII-XVII of FIG. 15 (first exemplary embodiment)

As shown in FIGS. 16 and 17, the housing main body 26 includes a top plate 30, a bottom plate 31, a left side plate 32, a right press-fit holding part 33, a left press-fit holding part 34, and a lance 35.

The top plate 30 and the bottom plate 31 are opposed to each other in the central axis direction. The top plate 30 is located above the bottom plate 31, and the bottom plate 31 is located below the top plate 30. A gap g is formed between the top plate 30 and the bottom plate 31. The gap g is slightly larger than the thickness of the receptacle contact 20 (see also FIG. 12).

The top plate 30 has a lower surface 30a. The lower surface 30a is a surface that faces the bottom plate 31. The lance 35 is formed on the lower surface 30a. The lance 35 is formed to prevent the receptacle contact 20 from being removed. The lance 35 is formed so as to extend from the lower surface 30a of the top plate 30 in the inserting direction D in a cantilever shape. A lance claw 35a is formed at the free end of the lance 35.

The bottom plate 31 has an upper surface 31a. The upper surface 31a is a surface that faces the top plate 30. An interference part insertion groove 36 is formed on the upper surface 31a. The interference part insertion groove 36 is formed on the counter-inserting direction side of the upper surface 31a. The upper side and the counter-inserting direction side of the interference part insertion groove 36 are opened. As shown in FIG. 17, the interference part insertion groove 36 is formed in such a manner that its width in the crosswise direction gradually decreases in the inserting direction D. The bottom plate 31 has a right inner wall surface 36a (inner wall surface, restricting part) and a left inner wall surface 36b (inner wall surface, restricting part). The right inner wall surface 36a is an inner wall surface that defines the bolting section protruding direction side of the interference part insertion groove 36. The left inner wall surface 36b is an inner wall surface that defines the bolting section counter-protruding direction side of the interference part insertion groove 36. The right inner wall surface 36a and the left inner wall surface 36b are opposed to each other. Therefore, the gap between the right inner wall surface 36a and left inner wall surface 36b gradually decreases in the inserting direction D.

The left side plate 32, the right press-fit holding part 33, and the left press-fit holding part 34 are all formed between the top plate 30 and the bottom plate 31.

The left side plate 32 and the left press-fit holding part 34 define the bolting section counter-protruding direction side of the gap g. The left side plate 32 adjoins the counter-inserting direction side of the left press-fit holding part 34. The left press-fit holding part 34 adjoins the inserting direction D side of the left side plate 32. The right press-fit holding part 33 defines the bolting section protruding direction side of the gap g. The right press-fit holding part 33 and the left press-fit holding part 34 are opposed to each other in the crosswise direction.

The right press-fit holding part 33 has a right press-fit holding surface 33a and a right contact insertion restricting surface 33b. The right press-fit holding surface 33a is a surface that faces the left press-fit holding part 34. The right contact insertion restricting surface 33b is a surface that faces in the counter-inserting direction.

The left press-fit holding part 34 has a left press-fit holding surface 34a and a left contact insertion restricting surface 34b. The left press-fit holding surface 34a is a surface that faces the right press-fit holding part 33. The left contact insertion restricting surface 34b is a surface that faces in the counter-inserting direction.

In this exemplary embodiment, as indicated by broken lines in FIGS. 16 and 17, the contact insertion hole 21 is formed by the lower surface 30a of the top plate 30, the upper surface 31a of the bottom plate 31, the right press-fit holding surface 33a of the right press-fit holding part 33, and the left press-fit holding surface 34a of the left press-fit holding part 34.

As shown in FIG. 16, the lance claw 35a of the lance 35 is located inside the contact insertion hole 21.

Further, as shown in FIGS. 16 and 17, a lightening 37 may be formed as appropriate.

The mating section 27 is formed so as to protrude from the housing main body 26 in the inserting direction D in a roughly rectangular-tube shape. As shown in FIG. 16, the mating section 27 provides a mating space S in which the plug connector 15 is received. On a mating top plate 27a of the mating section 27, a lance locking surface 27b (locking part) on which a locking claw 17 of the lance 16 of the plug housing 15b of the plug connector 15 shown in FIG. 17 is caught is formed.

(Receptacle Connector 5: Receptacle Contact 20)

Figure 19:
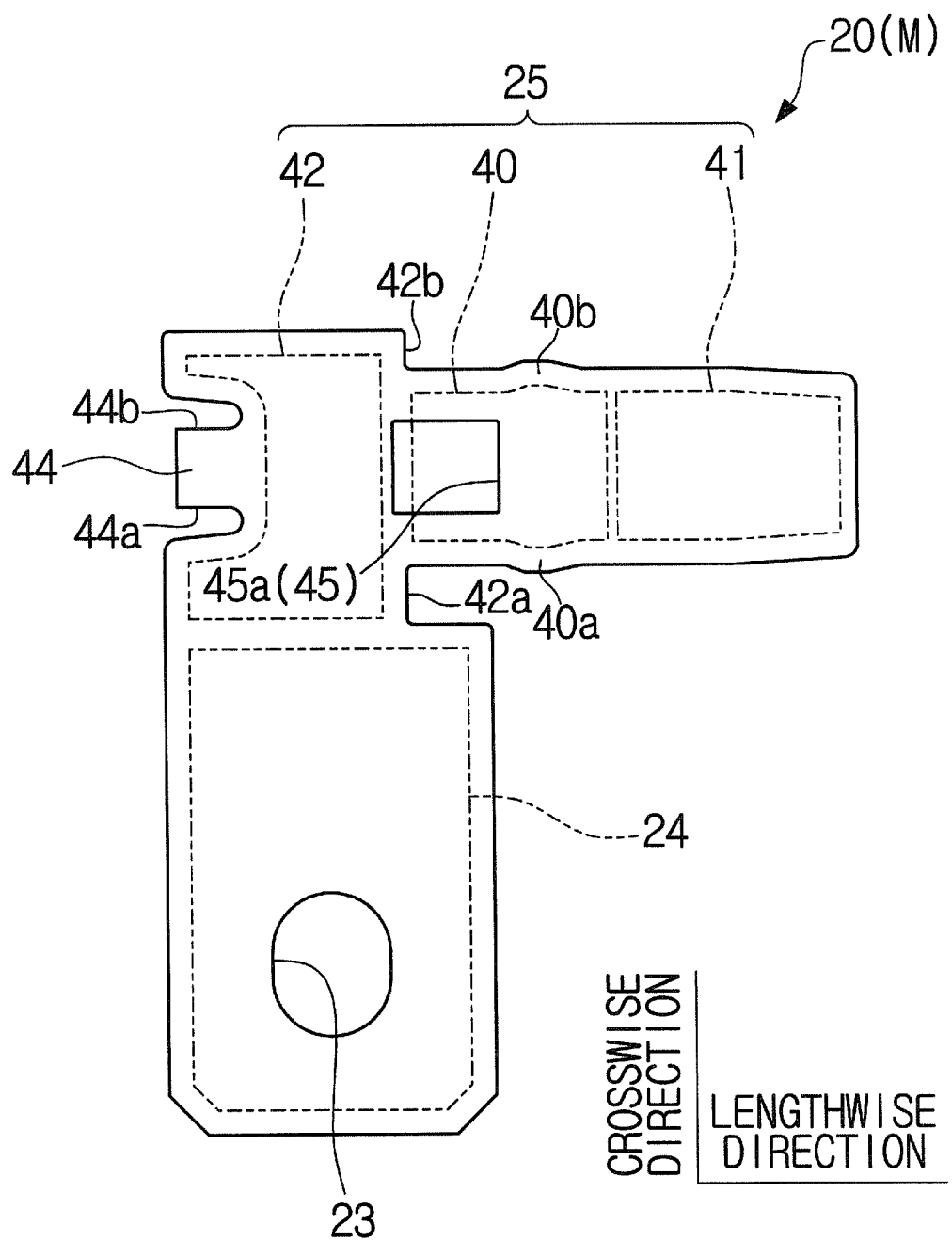
FIG. 19 is a plan view of the receptacle contact (first exemplary embodiment)

As shown in FIGS. 18 and 19, the receptacle contact 20 is formed by a metal plate M having a somewhat large thickness. As described previously, the receptacle contact 20 includes the bolting section 24 and the accommodated section 25. Specifically, the receptacle contact 20 includes an interference part 44 in addition to the bolting section 24 and the accommodated section 25. The accommodated section 25 includes a held part 40, a tip part 41, and a base end part 42. The bolting section 24 is roughly in parallel with the accommodated section 25 in the thickness direction. The thickness direction of each of the bolting section 24 and the accommodated section 25 is in parallel with the central axis direction. Further, the thickness direction of the interference part 44 is perpendicular to that of the base end part 42 and the like. The thickness direction of the interference part 44 is in parallel with the lengthwise direction. The base end part 42, the held part 40, and the tip part 41 are arranged in this listed order in the inserting direction D.

The held part 40 is a part that is accommodated in the contact insertion hole 21 of the housing main body 26 of the receptacle housing 22 shown in FIG. 17 and held by the housing main body 26 of the receptacle housing 22. As shown in FIG. 19, the held part 40 includes a right bulging part 40a bulging in the bolting section protruding direction and a left bulging part 40b bulging in the bolting section counter-protruding direction. The right bulging part 40a and the left bulging part 40b are formed near the tip part 41. Note that the width in the crosswise direction of the contact insertion hole 21 between the right press-fit holding surface 33a of the right press-fit holding part 33 and the left press-fit holding surface 34a of the left press-fit holding part 34 shown in FIG. 17 is adjusted so as to be slightly smaller than the width in the crosswise direction of the held part 40 including the right bulging part 40a and the left bulging part 40b shown in FIG. 19.

The tip part 41 is a part that protrudes from the held part 40 in the inserting direction D and is capable of coming into contact with the plug contact 15a of the plug connector 15 (see FIG. 7).

The base end part 42 is a part that protrudes from the held part 40 in the counter-inserting direction. The base end part 42 has a right shoulder surface 42a and a left shoulder surface 42b. The right shoulder surface 42a is located on the bolting section protruding direction side relative to the held part 40 and faces in the inserting direction D. The left shoulder surface 42b is located on the bolting section counter-protruding direction side relative to the held part 40 and faces in the inserting direction D.

The bolting section 24 is a part that protrudes from the base end part 42 in the bolting section protruding direction. A bolt hole 23 for bolting is formed in the bolting section 24.

As shown in FIG. 18, the interference part 44 is a part that protrudes from the base end part 42. The interference part 44 protrudes in an obliquely downward direction with respect to the base end part 42. In this exemplary embodiment, the interference part 44 protrudes from the base end part 42 in such a manner that the thickness direction of the interference part 44 is roughly perpendicular to that of the base end part 42. That is, the interference part 44 is formed so as to protrude downward from the base end part 42. The interference part 44 is disposed on the side opposite to the held part 40 across the base end part 42. The thickness direction of the interference part 44 is in parallel with the lengthwise direction. The interference part 44 has a right end surface 44a and a left end surface 44b. The right end surface 44a is an end surface that faces in the bolting section protruding direction. The left end surface 44b is an end surface that faces in the bolting section counter-protruding direction.

Further, a lance locking hole 45 is formed in the receptacle contact 20. The receptacle contact 20 has a lance locking surface 45a that defines the inserting direction D side of the lance locking hole 45. The lance locking surface 45a is located at roughly the center of the held part 40 in the lengthwise direction. In other words, the lance locking surface 45a, on which the lance claw 35a of the lance 35 is caught, is formed in the held part 40 of the receptacle contact 20.

(Method for Assembling Receptacle Connector 5)

Next, a method for assembling the receptacle connector 5 is explained with reference to FIGS. 20 and 21.

Figure 21:
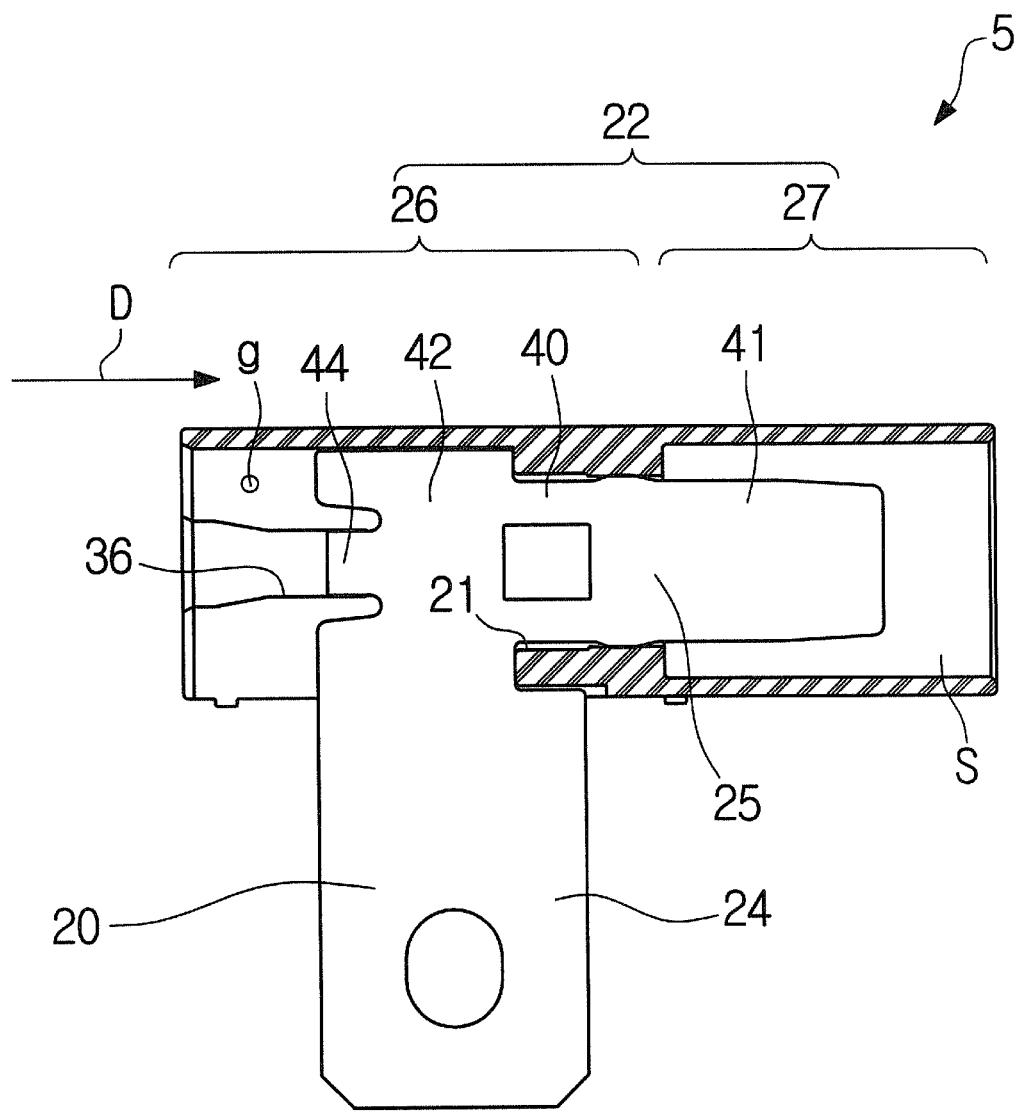
FIG. 21 is a cross section (corresponding to FIG. 17) showing a state where the receptacle contact is attached to the receptacle housing (first exemplary embodiment)

In order to assemble the receptacle connector 5, as shown in FIG. 21, the receptacle contact 20 is firmly inserted into the gap g of the receptacle housing 22.

As a result, the right shoulder surface 42a and the left shoulder surface 42b of the base end part 42 of the receptacle contact 20 shown in FIG. 19 are brought into contact with the right contact insertion restricting surface 33b of the right press-fit holding part 33 and the left contact insertion restricting surface 34b of the left press-fit holding part 34, respectively, of the receptacle housing 22 shown in FIG. 17, thus preventing the receptacle contact 20 from being inserted in the gap g of the receptacle housing 22 any further.

In the state shown in FIG. 21, the held part 40 of the receptacle contact 20 is press-fitted into the contact insertion hole 21 of the receptacle housing 22, so that the held part 40 is held by the receptacle housing 22. Specifically, by press-fitting the held part 40 of the receptacle contact 20 into the contact insertion hole 21, the held part 40 is caught in the receptacle housing 22 in the crosswise direction and, consequently, is held by the receptacle housing 22. More specifically, in the state shown in FIG. 21, the right bulging part 40a of the held part 40 of the receptacle contact 20 shown in FIG. 19 bites into the right press-fit holding surface 33a of the right press-fit holding part 33 of the housing main body 26 of the receptacle housing 22 shown in FIG. 17. Similarly, the left bulging part 40b of the held part 40 of the receptacle contact 20 shown in FIG. 19 bites into the left press-fit holding surface 34a of the left press-fit holding part 34 of the housing main body 26 of the receptacle housing 22 shown in FIG. 17. In this manner, as the held part 40 of the receptacle contact 20 is press-fitted into the contact insertion hole 21 of the receptacle housing 22, the held part 40 of the receptacle contact 20 is restrained in the receptacle housing 22 in the lengthwise direction and in the crosswise direction.

Further, in the state shown in FIG. 21, the interference part 44 of the receptacle contact 20 is press-fitted into the interference part insertion groove 36 of the receptacle housing 22. More specifically, the right end surface 44a of the interference part 44 of the receptacle contact 20 shown in FIG. 19 bites into the right inner wall surface 36a of the housing main body 26 of the receptacle housing 22 shown in FIG. 17. Similarly, the left end surface 44b of the interference part 44 of the receptacle contact 20 shown in FIG. 19 bites into the left inner wall surface 36b of the housing main body 26 of the receptacle housing 22 shown in FIG. 17. In this manner, as the interference part 44 of the receptacle contact 20 is press-fitted into the interference part insertion groove 36 of the receptacle housing 22, the interference part 44 of the receptacle contact 20 is restrained in the receptacle housing 22 in the lengthwise direction and in the crosswise direction.

Figure 20:
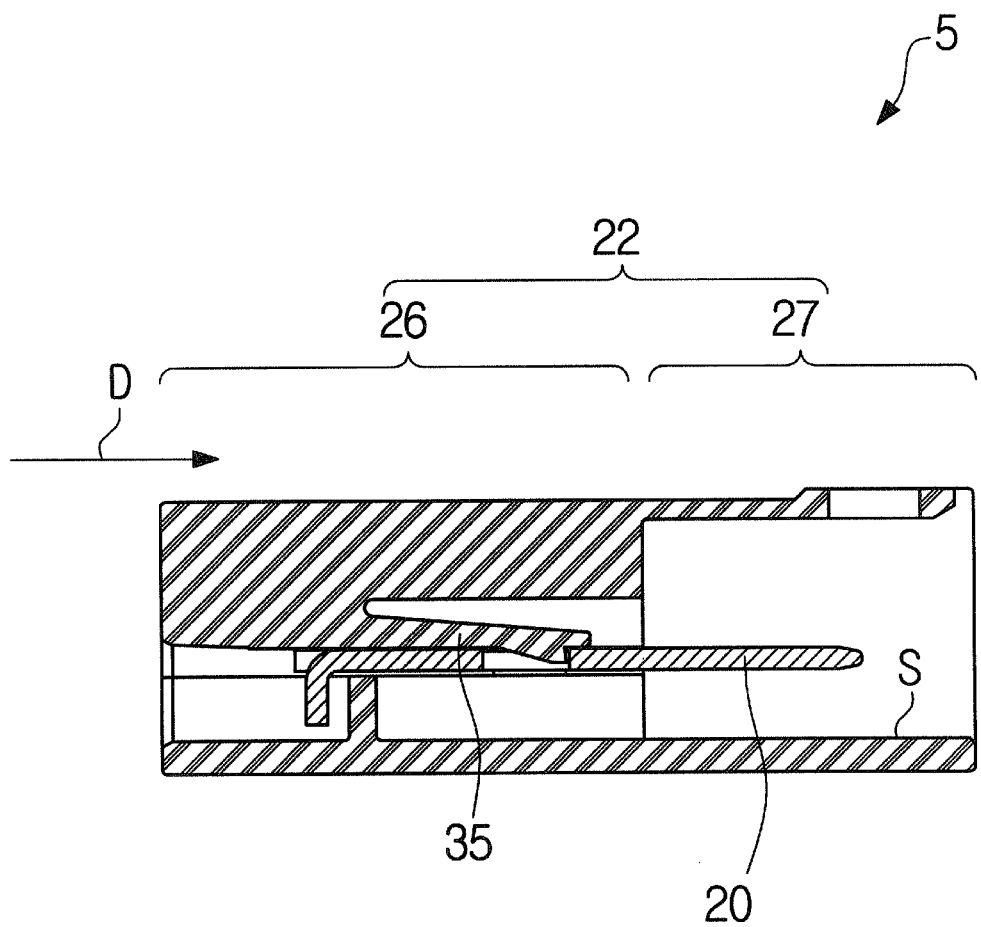
FIG. 20 is a cross section (corresponding to FIG. 16) showing a state where the receptacle contact is attached to the receptacle housing (first exemplary embodiment)

Further, in the state shown in FIG. 20, the receptacle contact 20 is locked by the lance 35 of the housing main body 26 of the receptacle housing 22. More specifically, the lance claw 35a of the lance 35 of the housing main body 26 of the receptacle housing 22 shown in FIG. 16 has penetrated into the lance locking hole 45 of the receptacle contact 20 shown in FIG. 19. As a result, the lance claw 35a of the lance 35 of the housing main body 26 of the receptacle housing 22 shown in FIG. 16 faces the lance locking surface 45a of the lance locking hole 45 of the receptacle contact 20 shown in FIG. 19. In this manner, since the lance claw 35a of the lance 35 of the housing main body 26 of the receptacle housing 22 is caught on the lance locking surface 45a of the lance locking hole 45 of the receptacle contact 20, the held part 40 of the receptacle contact 20 is held by the receptacle housing 22. This prevents the problem that the receptacle housing 22 could be pulled out in the inserting direction D from the receptacle contact 20 fixed to the battery 4 when, for example, the connecting cable 3 is accidentally pulled.

Further, in the state shown in FIG. 20, the tip part 41 of the receptacle contact 20 is located inside the mating space S of the mating section 27 of the receptacle housing 22 as shown in FIG. 21. The bolting section 24 of the receptacle contact 20 is located on the bolting section protruding direction side relative to the receptacle housing 22.

Figure 10:
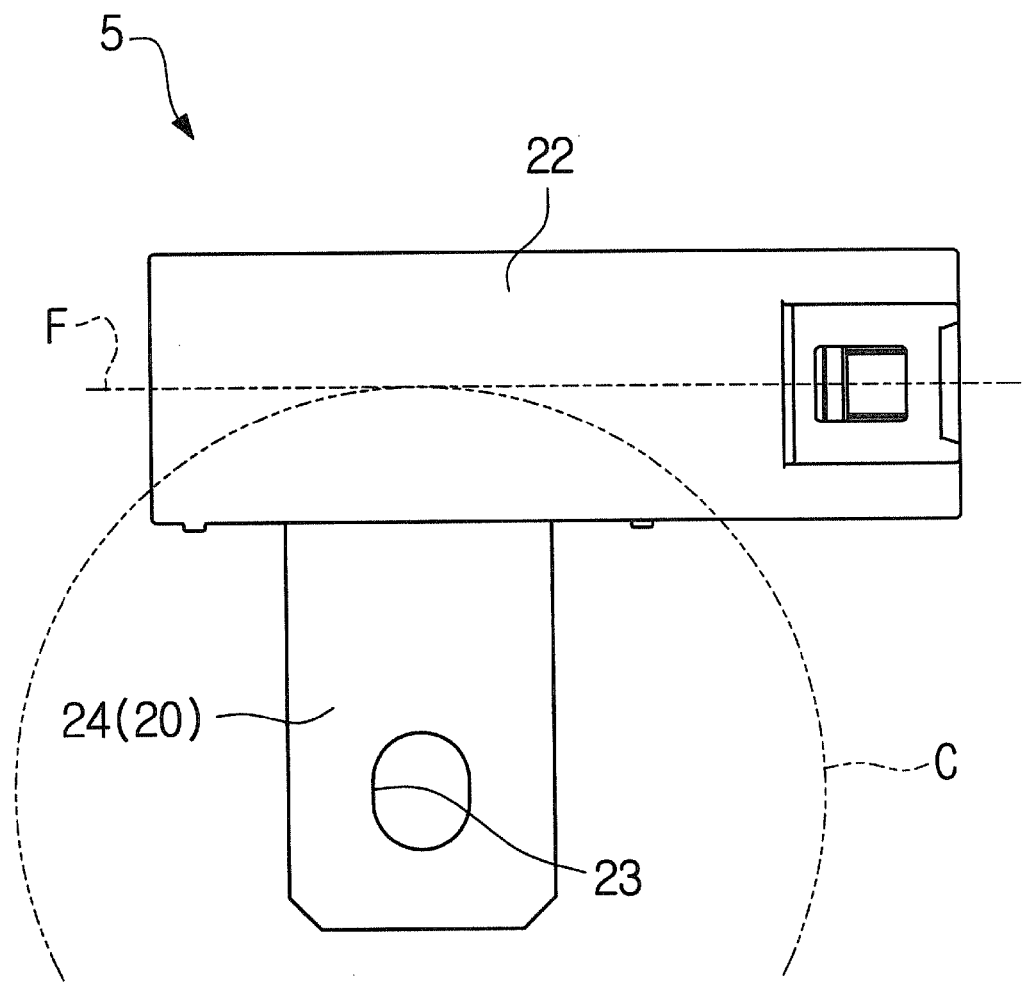
FIG. 10 is a plan view of the receptacle connector (first exemplary embodiment)
Figure 11:
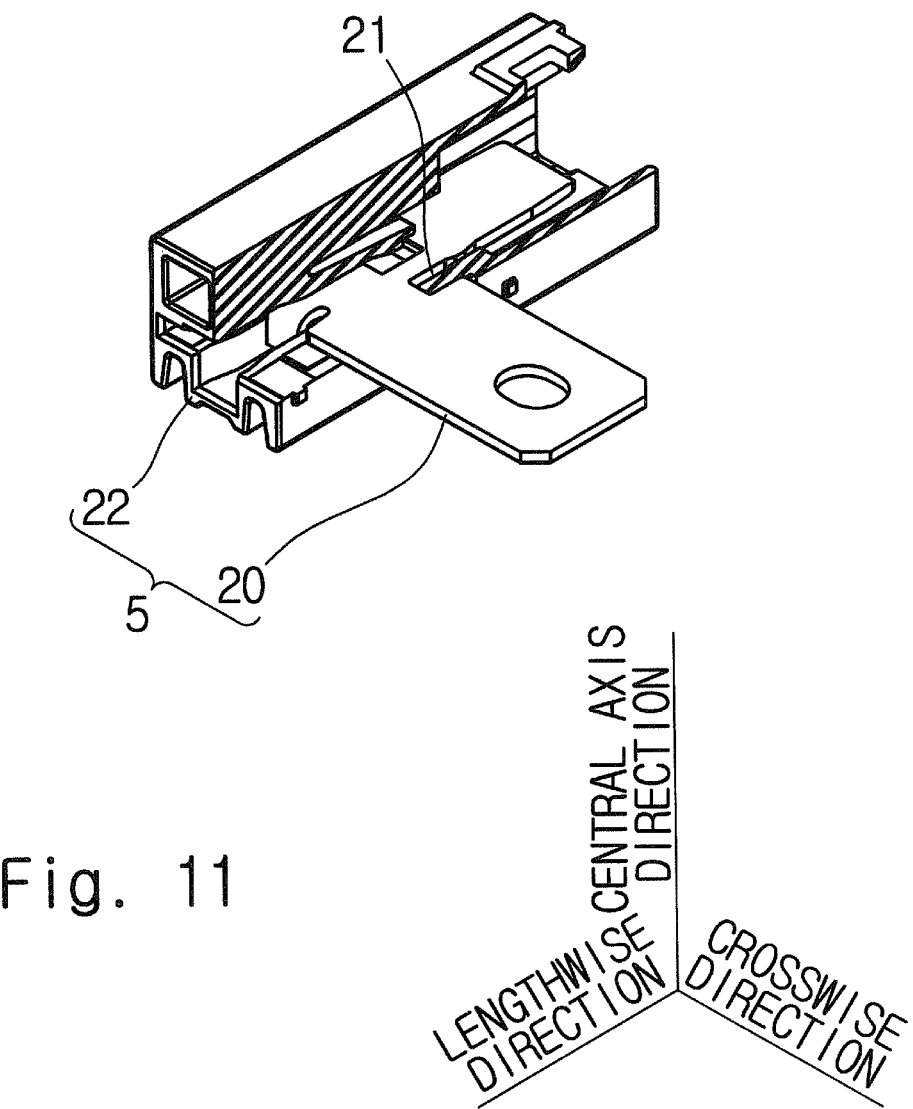
FIG. 11 is a partly-cut-out perspective view of the receptacle connector (first exemplary embodiment)
Figure 25:
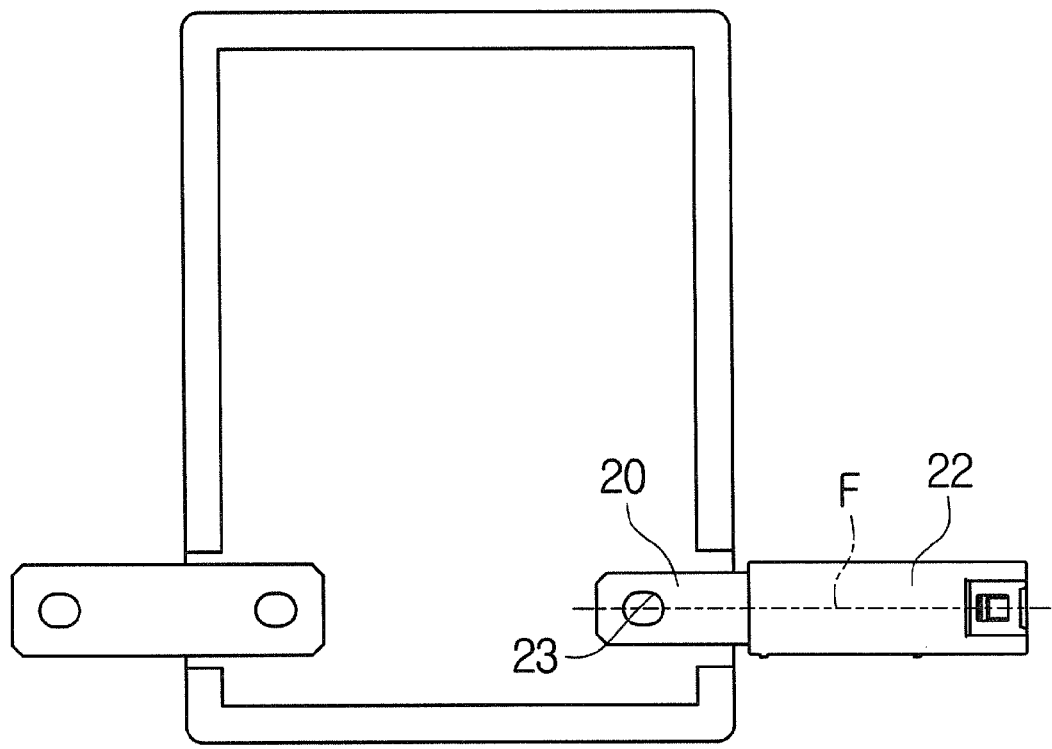
FIG. 25 is a plan view of a battery assembly (comparative example)
Figure 28:
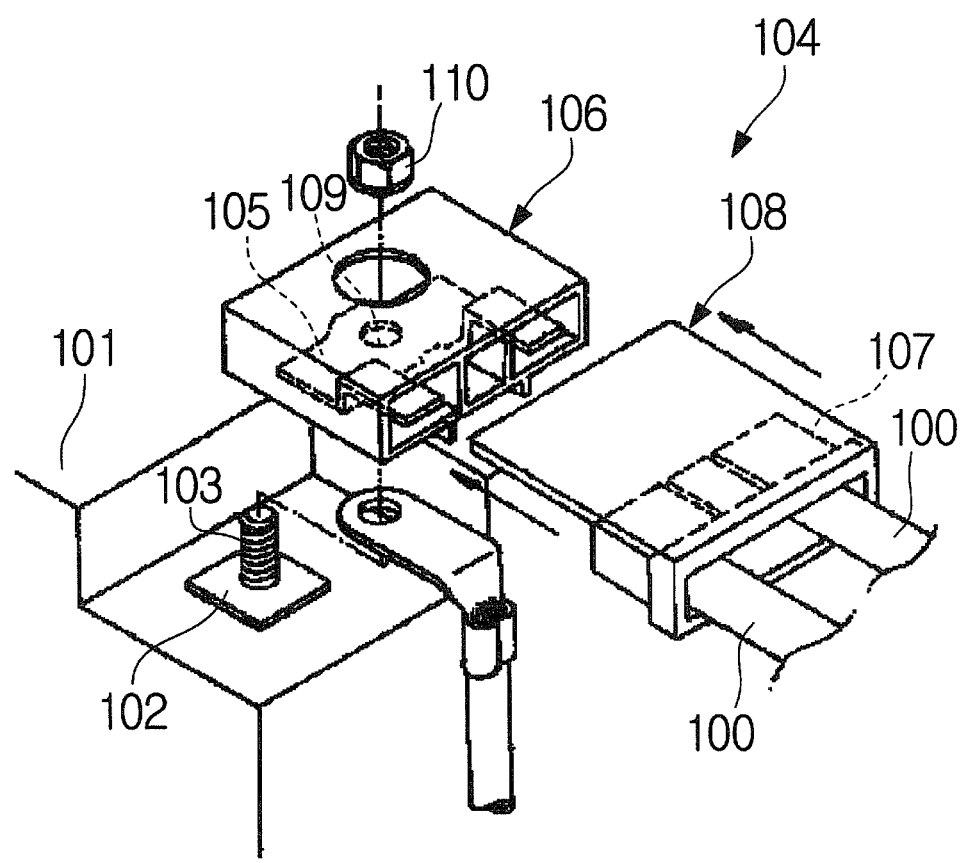
FIG. 28 is a figure corresponding to FIG. 1 of Patent Literature 1.

Further, in the state shown in FIG. 20, the lengthwise direction F of the receptacle housing 22 coincides with the tangent direction of an imaginary circle C centered on the bolt hole 23 as viewed in the central axis direction as shown in FIG. 10. In other words, the bolt hole 23 is deviated from an imaginary extension of the lengthwise direction F of the receptacle housing 22 as viewed in the central axis direction. That is, an aspect shown in FIG. 25 in which the bolt hole 23 is located on the imaginary extension of the lengthwise direction F of the receptacle housing 22 is excluded from the scope of this exemplary embodiment.

(Usage of Receptacle Connector 5 and its Workings)

Next, usage of the receptacle connector 5 and its workings are explained with reference to FIGS. 1 to 5 and FIGS. 22 to 24.

To attach the receptacle connector 5 to the battery terminal unit 10 of the battery 4 shown in FIG. 6, as shown in FIG. 5, the battery post 12 of the battery terminal unit 10 of the battery 4 is inserted into the bolt hole 23 of the receptacle contact 20 of the receptacle connector 5 and then the nut 7 is screwed on the battery post 12. In this way, the connecting cable 3 can be lead (or wired) from the front side of the battery 4.

In this bolting process, in this exemplary embodiment, as shown in FIGS. 2 and 3, the receptacle housing 22 of the receptacle connector 5 faces the right side surface 8c of the battery main body 8 of the battery 4. Specifically, the receptacle housing 22 of the receptacle connector 5 is capable of coming into contact with the right side surface 8c of the battery main body 8 of the battery 4. Further, as shown in FIG. 3, in the bolting process, the lengthwise direction F of the receptacle housing 22 of the receptacle connector 5 is roughly in parallel with the right side surface 8c of the battery main body 8 of the battery 4 as viewed in the central axis direction. Further, as shown in FIG. 4, in the bolting process, the lengthwise direction F of the receptacle housing 22 of the receptacle connector 5 is roughly in parallel with the upper surface 8a of the battery main body 8 of the battery 4 as viewed in the direction perpendicular to the right side surface 8c of the battery main body 8 of the battery 4.

Further, to mate the plug connector 15 shown in FIG. 7 with the receptacle connector 5 shown in FIG. 21, the plug connector 15 is inserted into the mating space S of the mating section 27 of the receptacle housing 22 of the receptacle connector 5. As a result, the locking claw 17 of the lance 16 of the plug housing 15b of the plug connector 15 is caught on the lance locking surface 27b of the mating section 27 of the receptacle housing 22 of the receptacle connector 5. By this action, the plug connector 15 is locked in the receptacle connector 5. By mating the plug connector 15 with the receptacle connector 5 as described above, the plug contact 15a of the plug connector 15 comes into contact with the tip part 41 of the receptacle contact 20 of the receptacle connector 5. As a result, the center conductor 14a of the connecting cable main body 14 of the connecting cable 3 is connected to the battery post 12 of the battery terminal unit 10 of the battery 4.

Figure 22:
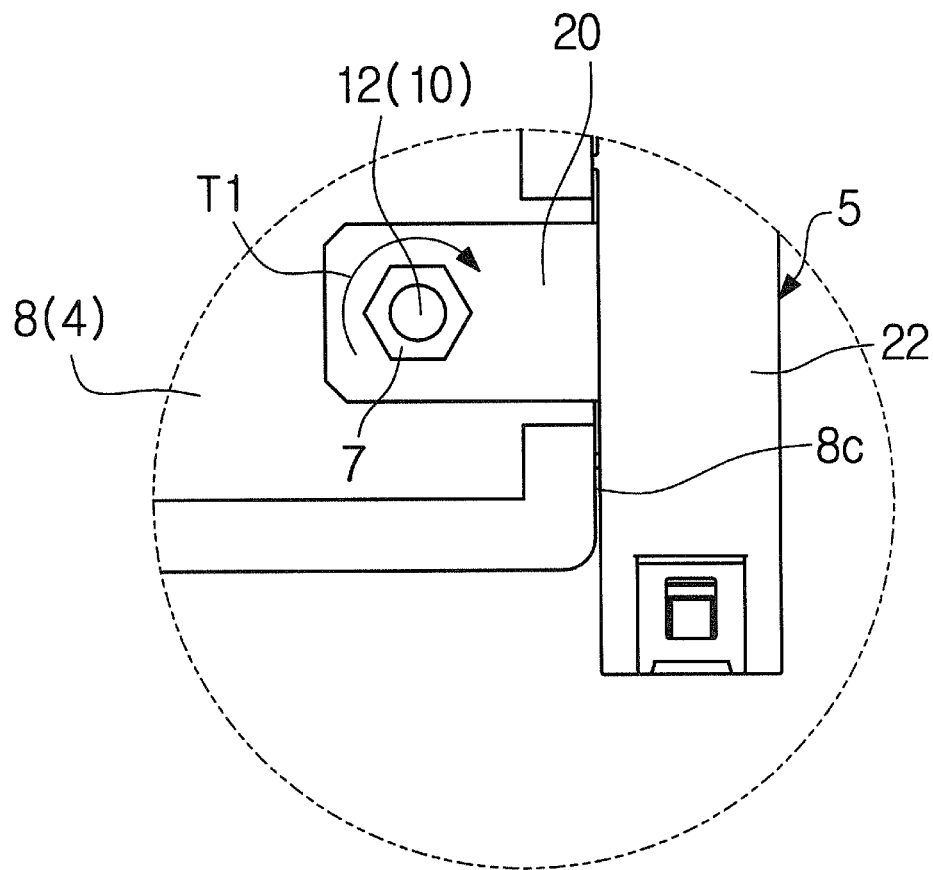
FIG. 22 is an enlarged view of a part A of FIG. 3 (first exemplary embodiment)

Note that as shown in FIG. 22, when the nut 7 is screwed on the battery post 12 of the battery terminal unit 10 of the battery 4, a clockwise torque T1 occurs in the receptacle contact 20 of the receptacle connector 5. Therefore, the receptacle connector 5 tries to rotate in the clockwise direction. However, since the receptacle housing 22 of the receptacle connector 5 is caught on the right side surface 8c of the battery main body 8 of the battery 4, the clockwise rotation of the receptacle connector 5 is restricted. Note that the state in which "the receptacle housing 22 of the receptacle connector 5 is caught on the right side surface 8c of the battery main body 8 of the battery 4" means a state in which "the rotation of the receptacle housing 22 of the receptacle connector 5 is prevented halfway through the rotation by the right side surface 8c of the battery main body 8 of the battery 4 and hence cannot be advanced any further".

Figure 23:
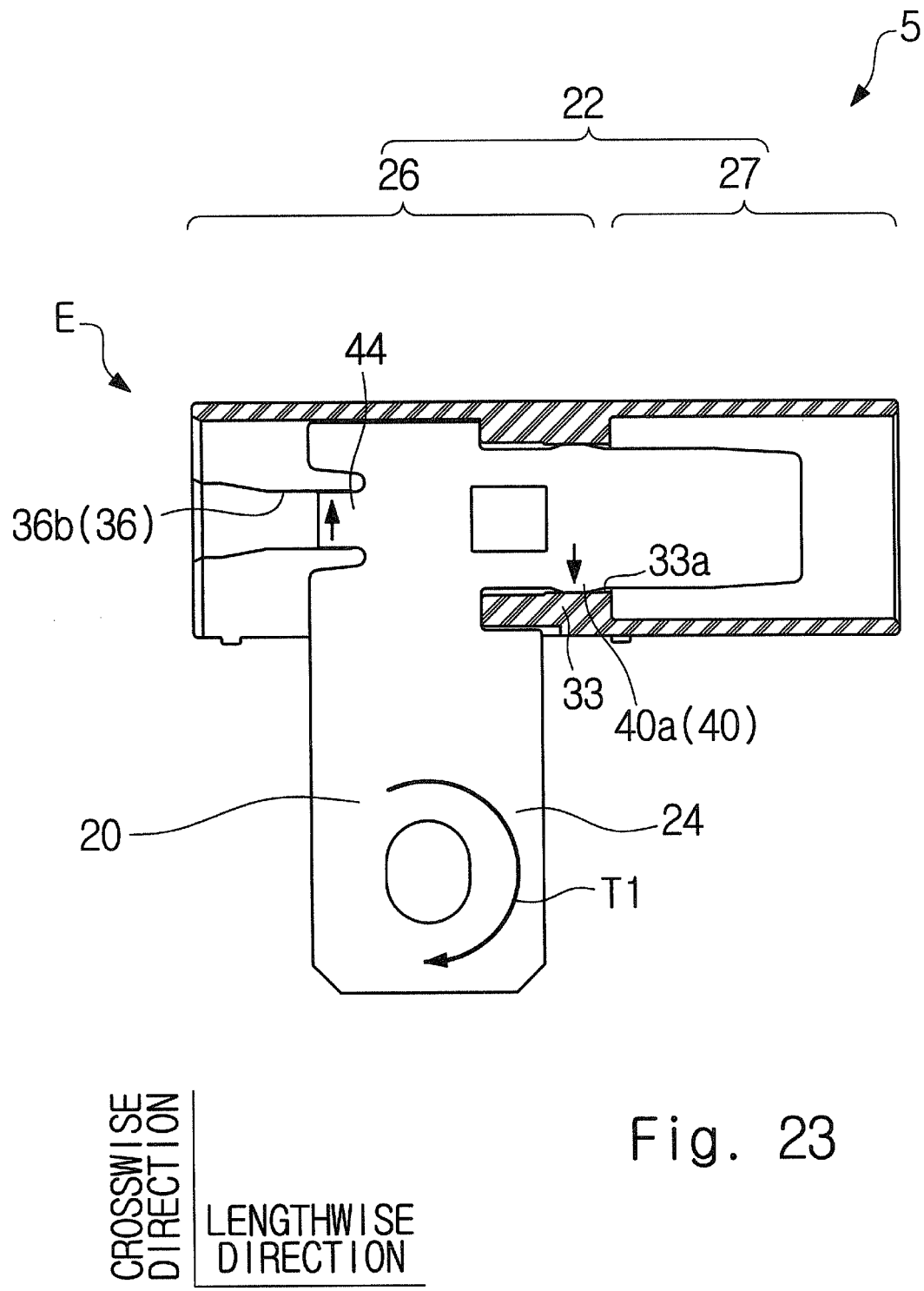
FIG. 23 is a cross section (corresponding to FIG. 21) of the receptacle connector and is for explaining workings of the receptacle connector (first exemplary embodiment)

Further, inside the receptacle connector 5, as shown in FIG. 23, the aforementioned torque T1 is received by the right press-fit holding surface 33a of the right press-fit holding part 33 of the housing main body 26 of the receptacle housing 22 and the left inner wall surface 36b of the housing main body 26 of the receptacle housing 22. Specifically, when the torque T1 occurs, the right bulging part 40a of the held part 40 of the receptacle contact 20 is immediately received by the right press-fit holding surface 33a of the right press-fit holding part 33 of the housing main body 26 of the receptacle housing 22. At the same time, the interference part 44 of the receptacle contact 20 is received by the left inner wall surface 36b of the housing main body 26 of the receptacle housing 22. That is, as the interference part 44 of the receptacle contact 20 tries to move relative to the receptacle housing 22 in the bolting section counter-protruding direction, the interference part 44 is received by the left inner wall surface 36b of the housing main body 26 of the receptacle housing 22. Therefore, even when the torque T1 occurs, the clockwise rotation of the receptacle contact 20 with respect to the receptacle housing 22 is reliably prevented.

On the other hand, when the nut 7 is loosened, a counter-clockwise torque occurs in the receptacle contact 20 of the receptacle connector 5. Therefore, the receptacle connector 5 tries to rotate in the counter-clockwise direction. However, since the receptacle housing 22 of the receptacle connector 5 is caught on the right side surface 8c of the battery main body 8 of the battery 4, the counter-clockwise rotation of the receptacle connector 5 is restricted.

Figure 24:
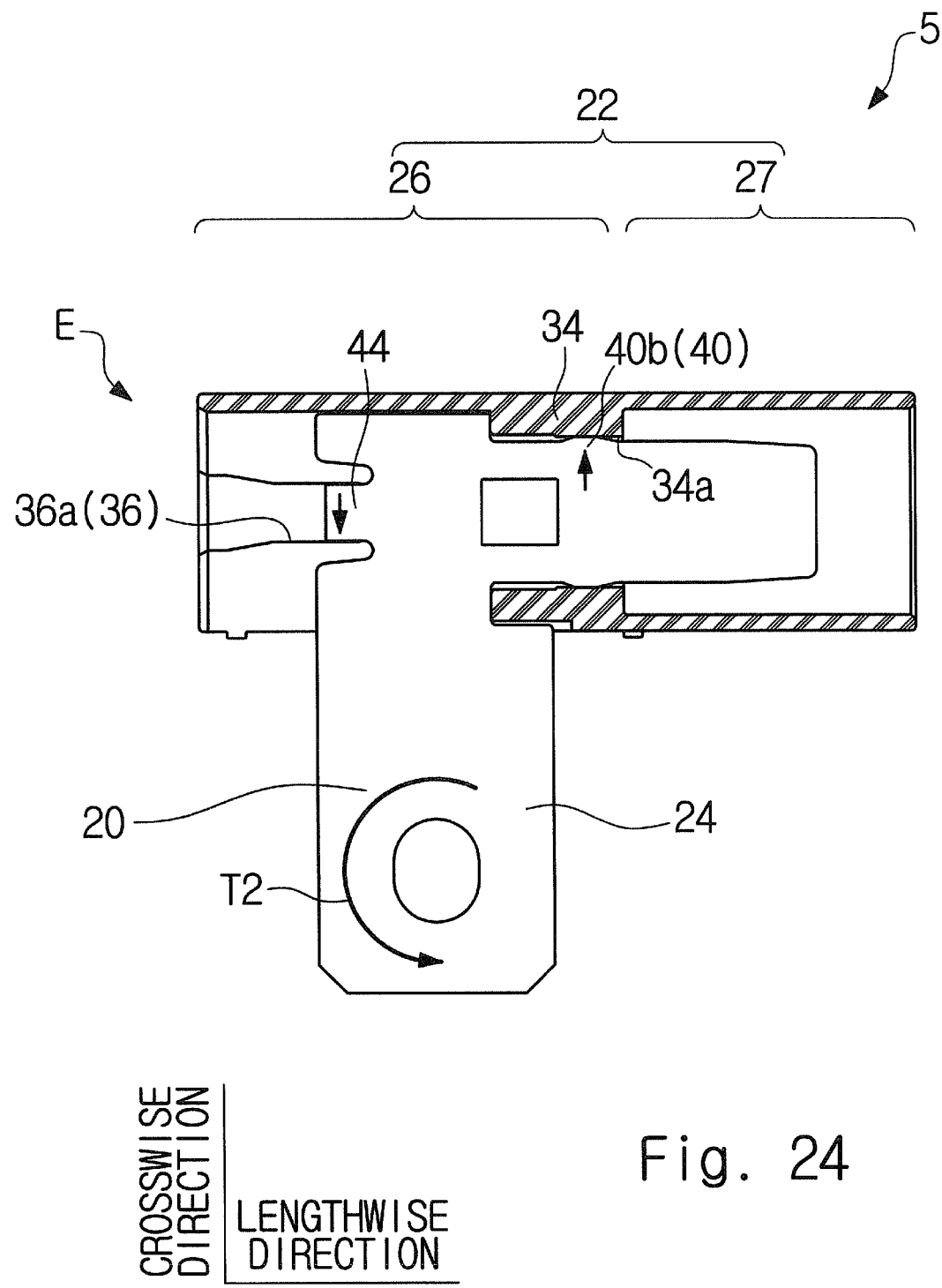
FIG. 24 is a cross section (corresponding to FIG. 21) of the receptacle connector and is for explaining workings of the receptacle connector (first exemplary embodiment)

Further, inside the receptacle connector 5, as shown in FIG. 24, the aforementioned counter-clockwise torque T2 is received by the left press-fit holding surface 34a of the left press-fit holding part 34 of the housing main body 26 of the receptacle housing 22 and the right inner wall surface 36a of the housing main body 26 of the receptacle housing 22. Specifically, when the torque T2 occurs, the left bulging part 40b of the held part 40 of the receptacle contact 20 is immediately received by the left press-fit holding surface 34a of the left press-fit holding part 34 of the housing main body 26 of the receptacle housing 22. At the same time, the interference part 44 of the receptacle contact 20 is received by the right inner wall surface 36a of the housing main body 26 of the receptacle housing 22. That is, as the interference part 44 of the receptacle contact 20 tries to move relative to the receptacle housing 22 in the bolting section protruding direction, the interference part 44 is received by the right inner wall surface 36a of the housing main body 26 of the receptacle housing 22. Therefore, even when the torque T2 occurs, the counter-clockwise rotation of the receptacle contact 20 with respect to the receptacle housing 22 is reliably prevented.

In this exemplary embodiment, as shown in FIGS. 23 and 24, the receptacle connector 5 includes a displacement restricting mechanism E that prevents the base end part 42 of the receptacle contact 20 from moving relative to the receptacle housing 22 in the bolting section protruding direction or the bolting section counter-protruding direction. Further, the displacement restricting mechanism E is formed by the interference part 44 and at least one of the right inner wall surface 36a and the left inner wall surface 36b.

The first exemplary embodiment according to the present invention, which is explained above, includes the following features.

(1) A battery assembly 2 (assembly) includes: a receptacle connector 5 (electric connector) including a receptacle contact 20 (contact) with a bolt hole 23 for bolting formed therein, and a receptacle housing 22 attached to the receptacle contact 20; and a battery 4 (object to be connected) having an upper surface 8a (first surface) on which the receptacle contact 20 of the receptacle connector 5 is attached by the bolting, and a right side surface 8c (second surface) roughly perpendicular to the upper surface 8a. The receptacle housing 22 of the receptacle connector 5 is formed so as to extend in an elongated shape along the tangent direction of an imaginary circle C centered on the central axis of the bolt hole 23 of the receptacle contact 20 of the receptacle connector 5 as viewed in the central axis direction of the bolt hole 23. The side surface 22a on the bolting section protruding direction side of the receptacle housing 22 of the receptacle connector 5 is capable of coming into contact with the right side surface 8c of the battery 4 at the time of the bolting. The above-described configuration provides an advantageous effect that since the receptacle housing 22 of the receptacle connector 5 is effectively caught on the right side surface 8c of the battery 4 at the time of the bolting, the rotation of the receptacle connector 5 with respect to the battery 4 is prevented.

(2) Further, as shown in FIG. 3, the receptacle housing 22 of the receptacle connector 5 is capable of being disposed relative to the battery 4 so that the lengthwise direction F of the receptacle housing 22 of the receptacle connector 5 is roughly in parallel with the right side surface 8c of the battery 4 at the time of the bolting as viewed in the central axis direction. The above-described configuration provides an advantageous effect that since the receptacle housing 22 of the receptacle connector 5 is caught on the right side surface 8c of the battery 4 more effectively at the time of the bolting, the rotation of the receptacle connector 5 with respect to the battery 4 is more reliably prevented.

(3) Further, as shown in FIG. 4, the receptacle housing 22 of the receptacle connector 5 is capable of being disposed relative to the battery 4 so that the lengthwise direction F of the receptacle housing 22 of the receptacle connector 5 is roughly in parallel with the upper surface 8a of the battery 4 at the time of the bolting as viewed in the direction perpendicular to the right side surface 8c. The above-described configuration provides an advantageous effect that since the receptacle housing 22 of the receptacle connector 5 is caught on the right side surface 8c of the battery 4 more effectively at the time of the bolting, the rotation of the receptacle connector 5 with respect to the battery 4 is more reliably prevented.

(4) Further, as shown in FIG. 19, the receptacle contact 20 of the receptacle connector 5 includes a bolting section 24 (first contact section) in which the bolt hole 23 is formed, and an accommodated section 25 (second contact section) that connects with the bolting section 24 and extends along the lengthwise direction F of the receptacle housing 22 of the receptacle connector 5.

(5) Further, the bolting section 24 is roughly perpendicular to the accommodated section 25. Specifically, the lengthwise direction of the bolting section 24 is roughly perpendicular to that of the accommodated section 25.

(6) Further, the receptacle contact 20 of the receptacle connector 5 is formed in a roughly L-shape.

(7) Further, as shown in FIG. 21, the receptacle housing 22 of the receptacle connector 5 accommodates the accommodated section 25.

(8) Further, the bolting section 24 and the accommodated section 25 connect to each other in a halfway part in the lengthwise direction F of the receptacle housing 22 of the receptacle connector 5.

(9) Further, the thickness direction of the bolting section 24 is roughly in parallel with that of the accommodated section 25.

(10) Further, as shown in FIG. 16, a lance locking surface 27b (locking part) for maintaining the connected state with a plug housing 15b (counterpart housing) of a plug connector 15 (counterpart connector) is formed in the receptacle housing 22 of the receptacle connector 5.

(11) Examples of the object to be connected include a battery 4.

Note that examples of the configuration for making the receptacle housing 22 hold the held part 40 include a configuration in which the held part 40 is press-fitted into the contact insertion hole 21 and a configuration using the lance 35. In the above-described first exemplary embodiment, both configurations are used together. However, only the former configuration or the latter configuration may be employed instead.

Figure 8:
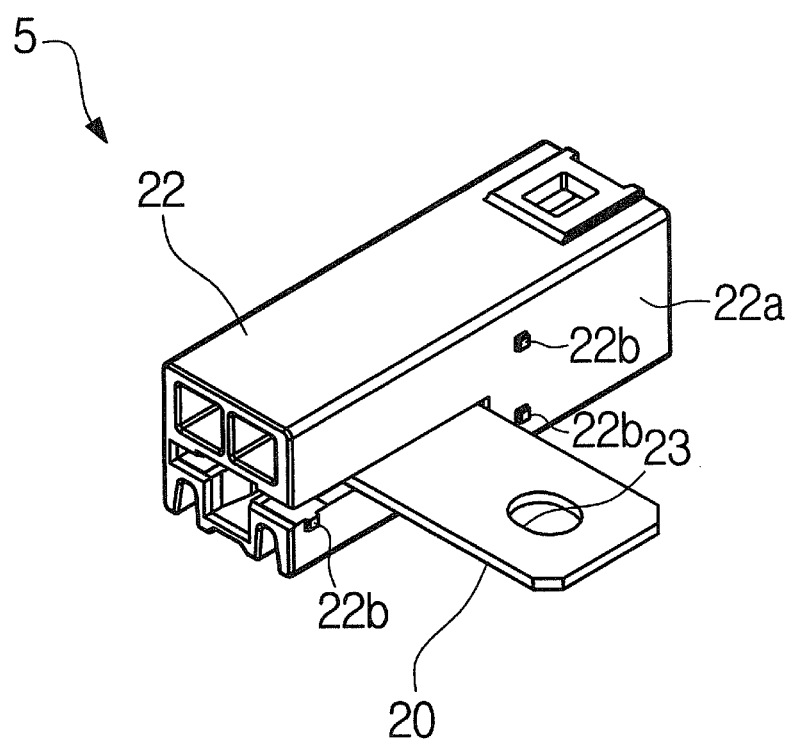
FIG. 8 is a perspective view of a receptacle connector (first exemplary embodiment)
Figure 9:
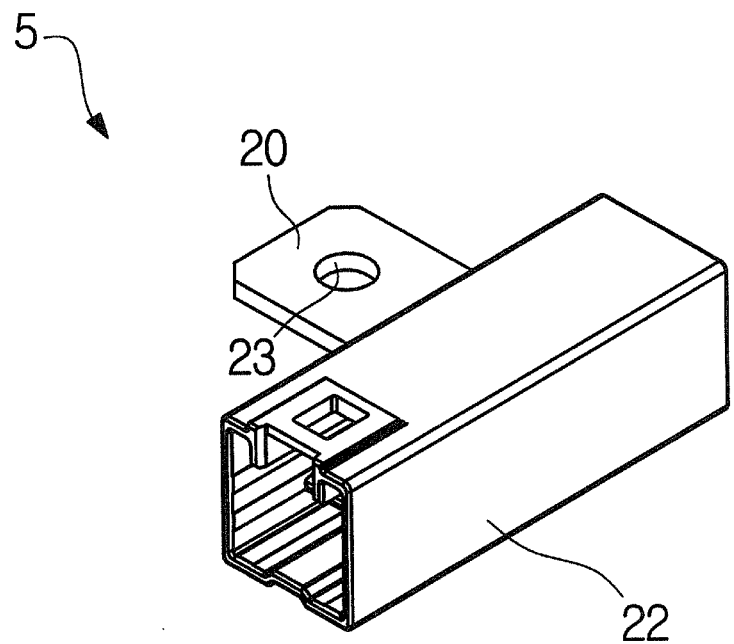
FIG. 9 is a perspective view of the receptacle connector as viewed from a different angle (first exemplary embodiment)

Further, although, as shown in FIG. 8, a plurality of protrusions 22b are formed on the side surface 22a on the bolting section protruding direction side of the receptacle housing 22 of the receptacle connector 5, these protrusions 22b can be omitted. The plurality of protrusions 22b are a part of the receptacle housing 22 of the receptacle connector 5.

Second Exemplary Embodiment

Next, a second exemplary embodiment according to the present invention is explained hereinafter with reference to FIG. 26. The following explanations are given with a particular emphasis on the differences between this exemplary embodiment and the above-described first exemplary embodiment, and duplicated explanations are omitted as appropriate. Further, in principle, components of the second exemplary embodiment which are the same as or correspond to those of the first exemplary embodiment are assigned the same symbols as those assigned to the components of the first exemplary embodiment.

In this exemplary embodiment, the accommodated section 25 of the receptacle contact 20 includes a rear end part 60 in addition to the held part 40, the tip part 41, and the base end part 42. The rear end part 60 is a part that protrudes from the base end part 42 in the counter-inserting direction.

Third Exemplary Embodiment

Next, a third exemplary embodiment according to the present invention is explained hereinafter with reference to FIG. 27. The following explanations are given with a particular emphasis on the differences between this exemplary embodiment and the above-described first exemplary embodiment, and duplicated explanations are omitted as appropriate. Further, in principle, components of the second exemplary embodiment which are the same as or correspond to those of the first exemplary embodiment are assigned the same symbols as those assigned to the components of the first exemplary embodiment.

In this exemplary embodiment, the bolting section 24 of the receptacle contact 20 is roughly perpendicular to the accommodated section 25. Specifically, the thickness direction of the bolting section 24 of the receptacle contact 20 is roughly perpendicular to that of the accommodated section 25 of the receptacle contact 20. The thickness direction of the bolting section 24 of the receptacle contact 20 is roughly in parallel with the central axis direction. The thickness direction of the accommodated section 25 of the receptacle contact 20 is roughly in parallel with the crosswise direction.

Note that the stacking rib 9 can be omitted in the above-described first to third exemplary embodiments.

This application is based upon and claims the benefit of priority from Japanese patent application No. 2012-220109, filed on Oct. 2, 2012, the disclosure of which is incorporated herein in its entirety by reference.

REFERENCE SIGNS LIST

1 BATTERY UNIT
2 BATTERY ASSEMBLY (ASSEMBLY)
3 CONNECTING CABLE
4 BATTERY (OBJECT TO BE CONNECTED)
5 RECEPTACLE CONNECTOR (ELECTRIC CONNECTOR)
6 BUS BAR
7 NUT
8 BATTERY MAIN BODY
8a UPPER SURFACE (FIRST SURFACE)
8b FRONT SURFACE
8c RIGHT SIDE SURFACE (SECOND SURFACE)
8d LEFT SIDE SURFACE
8e REAR SURFACE
8f CORNER PART
9 STACKING RIB
9b FRONT RIB
9c RIGHT SIDE RIB
9d LEFT SIDE RIB
9e REAR RIB
10 BATTERY TERMINAL UNIT
11 BATTERY TERMINAL
12 BATTERY POST
13 BATTERY TERMINAL UNIT ACCESS SLIT
14 CONNECTING CABLE MAIN BODY
14a CENTER CONDUCTOR
14b COVER MATERIAL
15 PLUG CONNECTOR (COUNTERPART CONNECTOR)
15a PLUG CONTACT
15b PLUG HOUSING (COUNTERPART HOUSING)
16 LANCE
17 LOCKING CLAW
20 RECEPTACLE CONTACT (CONTACT)
21 CONTACT INSERTION HOLE
22 RECEPTACLE HOUSING
22a SIDE SURFACE
22b PROTRUSION
23 BOLT HOLE
24 BOLTING SECTION (FIRST CONTACT SECTION)
25 ACCOMMODATED SECTION (SECOND CONTACT SECTION)
26 HOUSING MAIN BODY
27 MATING SECTION
27a MATING TOP PLATE
27b LANCE LOCKING SURFACE (LOCKING PART)
30 TOP PLATE
30a LOWER SURFACE
31 BOTTOM PLATE
31a UPPER SURFACE
32 LEFT SIDE PLATE
33 RIGHT PRESS-FIT HOLDING PART
33a RIGHT PRESS-FIT HOLDING SURFACE
33b RIGHT CONTACT INSERTION RESTRICTING SURFACE
34 LEFT PRESS-FIT HOLDING PART
34a LEFT PRESS-FIT HOLDING SURFACE
34b LEFT CONTACT INSERTION RESTRICTING SURFACE
35 LANCE
35a LANCE CLAW
36 INTERFERENCE PART INSERTION GROOVE
36a RIGHT INNER WALL SURFACE
36b LEFT INNER WALL SURFACE
37 LIGHTENING
40 HELD PART
40a RIGHT BULGING PART
40b LEFT BULGING PART
41 TIP PART
42 BASE END PART
42a RIGHT SHOULDER SURFACE
42b LEFT SHOULDER SURFACE
44 INTERFERENCE PART
44a RIGHT END SURFACE
44b LEFT END SURFACE
45 LANCE LOCKING HOLE
45a LANCE LOCKING SURFACE
60 REAR END PART
g GAP
D INSERTING DIRECTION
F LENGTHWISE DIRECTION
M METAL PLATE
S MATING SPACE
T1 TORQUE
T2 TORQUE
E DISPLACEMENT RESTRICTING MECHANISM

The invention claimed is:

1. An assembly comprising:
an electric connector comprising a contact with a bolt hole for bolting formed therein, and a housing attached to the contact; and
an object to be connected having an upper surface on which the contact of the electric connector is attached by the bolting, and a side surface roughly perpendicular to the upper surface, wherein
the contact includes a bolting section in which the bolt hole is formed therein and an accommodated section accommodated in the housing,
the bolting section protrudes outside from a side surface of the housing,
the housing of the electric connector is formed so as to extend, in an elongated shape, along a tangent direction of an imaginary circle centered on a central axis of the bolt hole of the contact of the electric connector as viewed in a central axis direction of the bolt hole, and
the side surface of the housing is capable of coming into contact with the side surface of the object to be connected at the time of the bolting.

2. The assembly according to claim 1, wherein the housing of the electric connector is capable of being disposed relative to the object to be connected so that a lengthwise direction of the housing of the electric connector is roughly parallel with the side surface of the object to be connected at the time of the bolting as viewed in the central axis direction.

3. The assembly according to claim 1, wherein the housing of the electric connector is capable of being disposed relative to the object to be connected so that a lengthwise direction of the housing of the electric connector is roughly parallel with the upper surface of the object to be connected at the time of the bolting as viewed in a direction perpendicular to the side surface of the object to be connected.

4. The assembly according to claim 1, wherein, the accommodated section extends along the lengthwise direction of the housing of the electric connector.

5. The assembly according to claim 4, wherein a lengthwise direction of the bolting section is roughly perpendicular to that of the accommodated section.

6. The assembly according to claim 5, wherein the contact of the electric connector is formed in a roughly L-shape.

7. The assembly according to claim 5, wherein the bolting section and the accommodated section connect to each other in a halfway part in the lengthwise direction of the housing of the electric connector.

8. The assembly according to claim 1, wherein a thickness direction of the bolting section is roughly parallel with that of the accommodated section.

9. The assembly according to claim 1, wherein in the housing of the electric connector, a locking part for maintaining a connected state with a counterpart housing of a counterpart connector is formed.

10. The assembly according to claim 1, wherein the object to be connected is a battery.

* * * * *